US010399778B1

(12) United States Patent
Shekhawat et al.

(10) Patent No.: US 10,399,778 B1
(45) Date of Patent: Sep. 3, 2019

(54) IDENTIFICATION AND PLANNING SYSTEM AND METHOD FOR FULFILLMENT OF ORDERS

(71) Applicant: GREY ORANGE PTE. LTD., Singapore (SG)

(72) Inventors: Anirudh Singh Shekhawat, Jaipur (IN); Sameer Narkar, Mumbai (IN); Akash Patil, Pune (IN); Avilash Kumar, Jamshedpur (IN); Vaibhav Tolia, Gurgaon (IN)

(73) Assignee: GREY ORANGE PTE. LTD., Singapore (SG)

( * ) Notice: Subject to any disclaimer, the term of this patent is extended or adjusted under 35 U.S.C. 154(b) by 0 days.

(21) Appl. No.: 16/170,958

(22) Filed: Oct. 25, 2018

(51) Int. Cl.
*G06F 7/00* (2006.01)
*B65G 1/137* (2006.01)

(52) U.S. Cl.
CPC .... *B65G 1/1373* (2013.01); *B65G 2203/0216* (2013.01); *G05B 2219/31286* (2013.01)

(58) Field of Classification Search
None
See application file for complete search history.

(56) References Cited

U.S. PATENT DOCUMENTS

2013/0123983 A1* 5/2013 Brog rdh ................. B25J 9/162 700/254
2013/0166061 A1* 6/2013 Yamamoto ............. B25J 9/1664 700/214
2016/0288318 A1* 10/2016 Nakazato ............... B25J 9/1666
2017/0235300 A1* 8/2017 Maruno .................... G06T 7/74 700/112

* cited by examiner

*Primary Examiner* — Yolanda R Cumbess
(74) *Attorney, Agent, or Firm* — Oblon, McClelland, Maier & Neustadt, L.L.P.

(57) ABSTRACT

A identification and planning system includes a scanner assembly, a robotic manipulator, and control server. The control server detects a first plurality of inventory items in a first inventory storage system and determines a first set of position parameters for a first inventory item from the detected first plurality of inventory items, with respect to a position of one or more image sensors in the scanner assembly. The control server generates a plurality of pick-path plans for the first inventory item, where each pick-path plan corresponds to a transformation of the determined first set of position parameters to a second set of position parameters with respect to the robotic manipulator. The control server further selects a first pick-path plan from the plurality of pick-path plans and controls the robotic manipulator to pick the first inventory item from the first inventory storage system, based on the first pick-path plan.

25 Claims, 13 Drawing Sheets

IDENTIFICATION AND PLANNING SYSTEM AND METHOD FOR FULFILLMENT OF ORDERS

CROSS-REFERENCE TO RELATED APPLICATIONS/INCORPORATION BY REFERENCE

None.

FIELD

Various embodiments of the disclosure relate to warehouse automation technology. More specifically, various embodiments of the disclosure relate to an identification and planning system and method for fulfillment of orders.

BACKGROUND

Advancements in warehouse automation technologies have pushed the development of advanced goods to person (GTP) systems for automated pickup, sortation, and/or put away of different types of inventory items for multi-line orders in fulfillment and distribution centers of a warehouse. Conventional GTP systems include a scanner, such as a camera, which is usually mounted on a robotic manipulator. The scanner detects and identifies different inventory items in a storage unit. Every time the scanner scans an inventory item, the robotic manipulator waits for the scan to complete and thereafter, generates an instruction to maneuver a robotic arm to pick a scanned inventory item. This causes a delay in response of the robotic manipulator to maneuver the robotic arm and pick the scanned inventory item. This further leads to increased cycle time to pick inventory items for one or more orders. Further, in a case where there is a demand for frequent shipments and shorter delivery times, output of a conventional GTP system or a warehouse automation system suffers based on throughput variability or even with a fall in throughput within and across shifts due to human factors. This leads to error-prone order fulfillment and inflated order picking and processing costs in the supply chain, which may be undesirable.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An identification and planning system and method for fulfillment of orders is substantially shown in, and/or described in connection with, at least one of the figures, as set forth more completely in the claims.

In one embodiment there is provided an identification and planning system. The system includes a scanner assembly, a robotic manipulator, and a control server. The scanner assembly includes one or more image sensors. The robotic manipulator includes a robotic arm and an end effector detachably attached to the robotic arm. The control server includes control circuitry, which is configured to detect, by the one or more image sensors, a first plurality of inventory items in a first inventory storage system. The control circuitry is configured to determine a first set of position parameters for a first inventory item from the detected first plurality of inventory items, with respect to a position of an image sensor of the one or more image sensors in the scanner assembly. The control circuitry is configured to generate a plurality of pick-path plans for the first inventory item. Each pick-path plan of the plurality of pick-path plans corresponds to a transformation of the determined first set of position parameters to a second set of position parameters with respect to the robotic manipulator. The control circuitry is configured to select a first pick-path plan from the plurality of pick-path plans. The first pick-path plan is selected before a pick operation is executed on the first inventory item. The selection of the first pick-path plan is based on a success of the pick operation in a test computer-simulation, based on the second set of position parameters corresponding to the selected first pick-path plan. The control circuitry is configured to, in the pick operation, control the robotic arm and the end effector to pick the first inventory item from the first inventory storage system, based on the first pick-path plan.

In one embodiment, there is provided an identification and planning system. The system includes a control server. The control server includes control circuitry, which is configured to detect a first plurality of inventory items in a first inventory storage system. The control circuitry is configured to determine a first set of position parameters for a first inventory item from the detected first plurality of inventory items, with respect to a position of an image sensor of one or more image sensors. The control circuitry is configured to generate a plurality of pick-path plans for the first inventory item. Each pick-path plan of the plurality of pick-path plans corresponds to a transformation of the determined first set of position parameters to a second set of position parameters with respect to a robotic manipulator. The control circuitry is configured to select a first pick-path plan from the plurality of pick-path plans. The first pick-path plan is selected before a pick operation is executed on the first inventory item. The selection of the first pick-path plan is based on a success of the pick operation in a test computer-simulation, based on the second set of position parameters corresponding to the first pick-path plan. The control circuitry is configured to, in the pick operation, control a robotic arm and an end effector detachably attached to the robotic arm, to pick the first inventory item from the first inventory storage system, based on the selected first pick-path plan.

In one embodiment, there is provided a method of an identification and planning system that includes control circuitry and one or more image sensors. In the method, a first plurality of inventory items in a first inventory storage system is detected by the one or more image sensors. A first set of position parameters is determined, by the control circuitry, for a first inventory item from the detected first plurality of inventory items, with respect to a position an image sensor of the one or more image sensors. A plurality of pick-path plans are generated, by the control circuitry, for the first inventory item. Each pick-path plan of the plurality of pick-path plans corresponds to a transformation of the determined first set of position parameters to a second set of position parameters with respect to a robotic manipulator. A first pick-path plan is selected, by the control circuitry, from the plurality of pick-path plans. The first pick-path plan is selected before a pick operation is executed on the first inventory item. The selection of the first pick-path plan is based on a success of the pick operation in a test computer-simulation, based on the second set of position parameters corresponding to the first pick-path plan. In the pick operation, a robotic arm and an end effector detachably attached to the robotic arm are controlled by the control circuitry, to pick the first inventory item from the first inventory storage system, based on the selected first pick-path plan.

In one embodiment, there is provided a non-transitory computer-readable medium storing instructions which when executed by at least one processor cause the at least one processor to perform the method of the identification and planning system described above.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
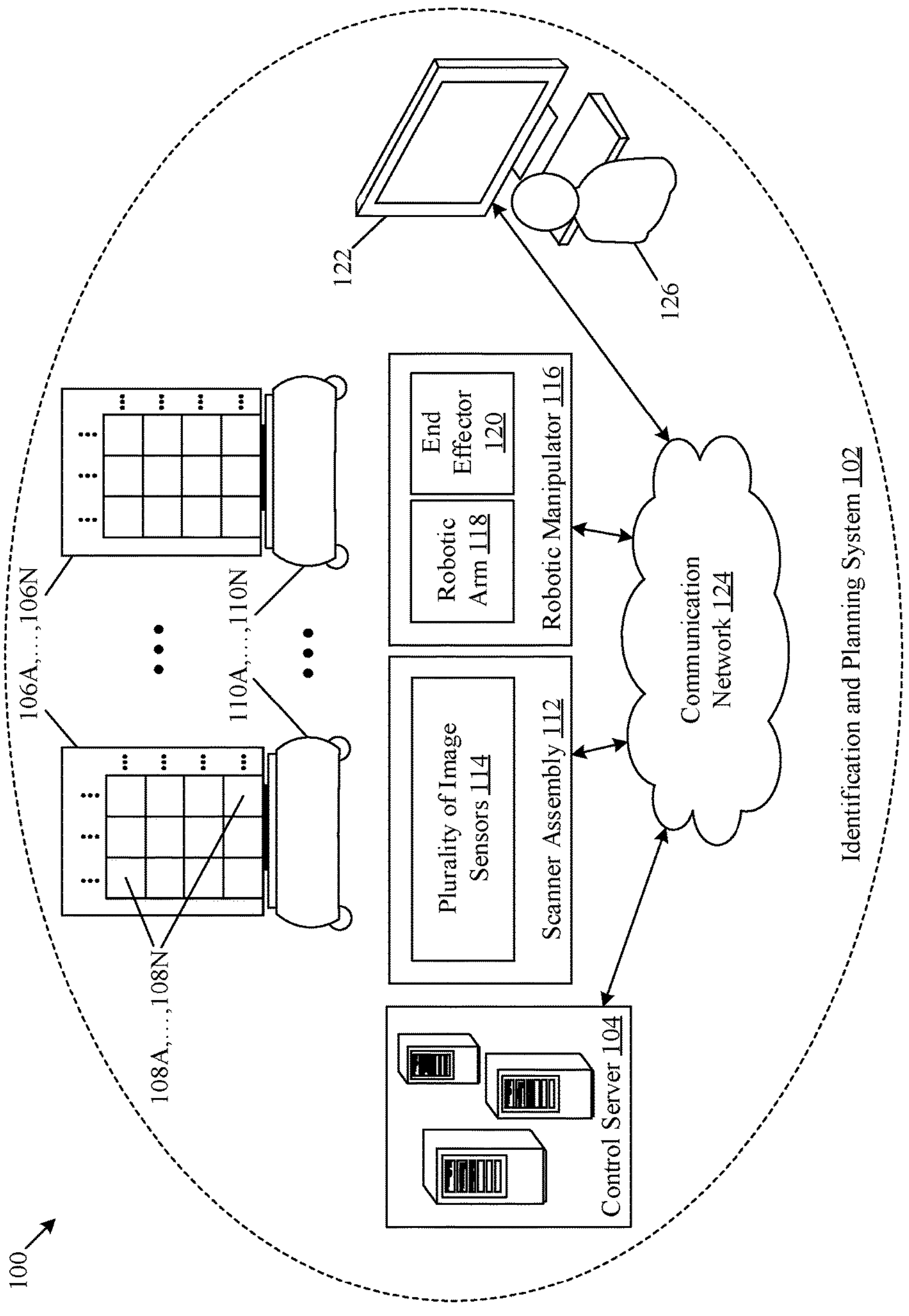
FIG. 1 illustrates a block diagram of an identification and planning system for fulfillment of orders, in accordance with an embodiment of the disclosure.

The following described implementations may be found in a disclosed identification and planning system and method for fulfillment of orders. The disclosed identification and planning system provides a solution to minimize a loss of throughput and optimize the total cycle time in pickup of different types of inventory items (e.g., Fast-moving consumer goods (FMCG), durable goods, or other consumer goods) from inventory storage systems. The disclosed identification and planning system includes a scanner assembly and a robotic manipulator, which are spatially located at different positions in a warehouse. As a result of such positioning of the scanner assembly and the robotic manipulator, the optimization may be achieved based on execution of a scanning and a pick-path planning operation prior to a pick operation by the robotic manipulator. The path planning operation may correspond to estimation of optimal position values (i.e. an optimal pick-path plan or a put-path plan along horizontal, vertical, and rotational axes) for the robotic manipulator. Such optimal position values may be used to control the robotic manipulator to execute the pick operation or a put operation. In the pick operation (or the put operation), an end-effector of the robotic manipulator may be maneuvered based on the optimal position values to pick (or put) an item (e.g., an ordered good) from (or to) a storage rack (or a pallet) of a storage system in vicinity of the robotic manipulator Further, the disclosed solution determines an optimal pick-path plan before the inventory storage system reaches the robotic manipulator for the pick operation. This further optimizes additional delay overheads, such as order picking time and response time of the robotic manipulator, in fulfillment of orders. The determination of the pick-path plan is done in a simulated environment, where different position and grabbing parameters of the robotic manipulator are recursively modified to identify optimal position and grabbing parameters. The application of the optimal position and grabbing parameters may result in success of the pick operation in each attempt to pick an inventory item. Also, the success of the pick operation may be attributed to an implementation of a GTP system. As compared to a Person to Goods (PTG) system, where individual worker has to manually approach a storage system, pick and further drop the inventory item into dedicated totes, the use of a GTP system helps with a planned organization for inventory items on different storage systems and a planned support of multiple mobile robots to move the inventory items. This planned organization of inventory items further helps to predict inventory movement and a control over a rate of order fulfillment in real time or near real time. The planned organization of different inventory items may be achieved based on historical demand, current demand, and demand forecasts for different inventory items. There may not be a requirement to process pick-path plans at the robotic manipulator end. Thus, in disclosed solution, a lower cycle time for order picking may be achieved as compared to conventional GTP picking systems.

The disclosed solution also provides a queuing stage. In the queuing stage, an inventory storage system may be placed for a pick operation in a queue in parallel with a scanning operation for another inventory storage system. As the scanning operation and pick-path planning operation occurs prior to the pick operation, the picking time is significantly reduced as compared to picking time of conventional GTP systems. Hence, the disclosed solution gives higher throughput as compared to conventional GTP systems. As the scanning operation occurs before the pick operation, only automatically pickable inventory items may be selected for the pick operation. This may ensure an accuracy in order fulfillment and further make sure only those orders that contain all the automatically pickable inventory items are approved for autonomous picking. Orders that contain manually pickable inventory items may be processed through an order consolidation stage, where such inventory items are manually picked and handled by workers in the warehouse. The process of order consolidation may be executed prior to the pick operation by the identification and planning system.

As a conventional warehouse may handle high throughput variability within and across shifts due to human factors, the proposed solution provides a way to maintain a consistent throughput and error-free order fulfillment, with lower cost per shipment that gives businesses a competitive edge over competitors. The proposed solutions also enhances capabilities of conventional GTP systems to run multiple shifts to meet peak demand cycles and improve overall efficiency and productivity of the supply chain.

FIG. 1 illustrates a block diagram of an identification and planning system for fulfillment of orders, in accordance with an embodiment of the disclosure. In FIG. 1, there is shown a block diagram 100 of an identification and planning system 102. The identification and planning system 102 includes a control server 104, a plurality of inventory storage systems 106A, . . . , 106N (which includes a plurality of storage bins 108A, . . . , 108N), a plurality of mobile robots 110A, . . . , 110N, and a scanner assembly 112 (which includes a plurality of image sensors 114). The identification and planning system 102 further includes a robotic manipulator 116 (which includes a robotic arm 118 and an end effector 120) and a human machine interface (HMI) 122. There is further shown a communication network 124 that is communicatively coupled to the control server 104, the plurality of inventory storage systems 106A, . . . , 106N, the plurality of mobile robots 110A, . . . , 110N, the scanner assembly 112, the robotic manipulator 116, and the HMI 122. Also, there is shown a user 126 associated with the HMI 122.

Figure 3:
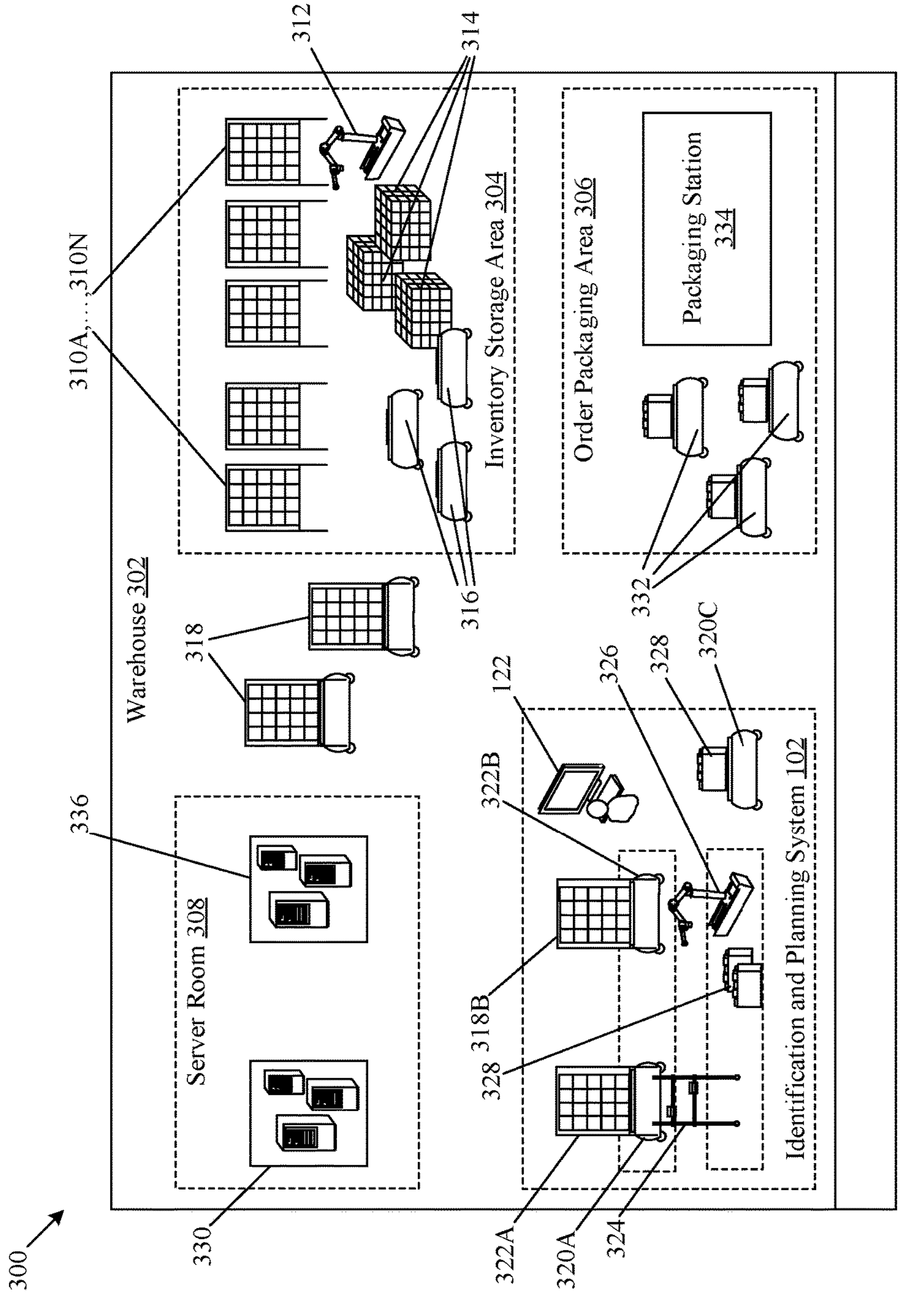
FIG. 3 illustrates an exemplary warehouse scenario that comprises the identification and planning system of FIG. 1, in accordance with an embodiment of the disclosure.

The identification and planning system 102 may comprise suitable logic, circuitry, and interfaces that may be configured to control pickup, storage, put away, or replenishment of different inventory items in one or more fulfillment and distribution centers of a warehouse (an example of a warehouse scenario is shown in FIG. 3). The identification and planning system 102 may be configured to manage a robotic goods-to-person (GTP) setup, where different inventory items are automatically picked up from inventory storage systems (e.g., mobile storage units (MSUs)) and provided to pick-up stations or transferred to packaging stations of the warehouse. The identification and planning system 102 may include one or more control servers (e.g., the control server 104) that may control different operations, such as detection of inventory items, planning of a pick-path plan (i.e., a grab and pick strategy) for the robotic manipulator 116, and execution of the pick-path plan to pick specific inventory items.

The control server 104 may comprise suitable logic, circuitry, and interfaces that may be configured to control execution of different operations associated with put away or pickup of different inventory items from one or more inventory storage systems in a fulfillment and distribution center of the warehouse. Also, the control server 104 may be configured to control execution of different operations associated with replenishment (e.g., a put operation of the robotic manipulator 116) of the inventory storage systems, an order consolidation for different types of inventory items to be picked up in a cycle or an order batch, an order sorting operation, palletization and/or de-palletization of inventory items, and the like. Some of the operations may include, but are not limited to, inventory profiling, pickup planning and verification for inventory items, and inventory pickup and transfer to pick up stations in the warehouse. The control server 104 may be part of an automated warehouse management system (WMS), which may be a standalone system. Alternatively, the control server 104 may be integrated with the automated WMS. Also, in certain cases, the control server 104 may be further integrated with supply chain systems and/or integrated enterprise resource planning (ERP) systems. As an example, the control server 104 may be a centralized (private or a shared) cloud server, a part of a warehouse data center, or a cluster of local in-house servers, where each server may be dedicated for a specific operation of the identification and planning system 102.

The plurality of inventory storage system 106A, . . . , 106N may be physical storage units, where each physical storage unit may include a plurality of storage bins 108A, . . . , 108N. Each storage bin of the plurality of storage bins 108A, . . . , 108N may be present at different spatial positions in an inventory storage system to accommodate a plurality of inventory items. Examples of an inventory storage system may include, but are not limited to, multi-tier racks, pallet racks, shelves, mobile shelves, mezzanine floors, vertical lift modules, horizontal carousels, conveyors, and vertical carousels. In certain embodiments, the plurality of inventory storage systems 106A, . . . , 106N may correspond to mobile storage units movable from one storage space to another storage space in the warehouse. In such implementations, the movement of the plurality of inventory storage systems 106A, . . . , 106N may be enabled by the plurality of mobile robots 110A, . . . , 110N.

The plurality of mobile robots 110A, . . . , 110N may be autonomous mobile robots, (AMRs), autonomous guided vehicles (AGVs), or a combination thereof, in fulfillment centers and distribution centers of the warehouse. The plurality of mobile robots 110A, . . . , 110N may include suitable logic, circuitry, and interfaces that may be configured to automate put-away, storage, replenishment and pickup of payloads (e.g., inventory storage systems or palette of inventory items) in a fulfillment and distribution center of a warehouse. For the identification and planning system 102, each mobile robot of the plurality of mobile robots 110A, . . . , 110N may be configured to enable (as part of a GTP setup) movement of a payload from inventory storage areas to different scanning and picking areas (e.g., a queuing station for order pickup) reserved for the scanner assembly 112 and the robotic manipulator 116.

In some embodiments, each mobile robot of the plurality of mobile robots 110A, . . . , 110N may include different functional components, such as a lifting mechanism, an adaptive payload management system, and an autonomous guidance system, by use of which a payload (e.g., an inventory storage system or inventory palette) may be moved through different locations in the warehouse. Each mobile robot may be equipped with suitable components to enable a multi-floor transfer of goods, for example, a mobile robot may move within different floors and fulfil the requirements of the identification and planning system 102 by picking different MSUs from one floor and transferring it to a pick-to-pallet system (PPS). The PPS may correspond to an area in the warehouse where inventory items are put away or picked up from by human operators prior to inbound putting onto shelves or after outbound picking from shelves of different inventory storage systems.

In addition, each mobile robot may be configured to adapt to different functional parameters, e.g., payload weight, transfer path, cycle time, etc., in accordance with seamlessly changing of inventory profiles, demand patterns, and order peaks. Each mobile robot from the plurality of mobile robots 110A, . . . , 110N may be functionally same or different from each other, with possible variations in payload capacity (in pounds (lbs) or kilograms (Kgs)).

The scanner assembly 112 may corresponds to a three-dimensional (3D) camera system for detection and/or identification of different inventory items in an inventory storage system of the plurality of inventory storage systems 106A, . . . , 106N. As part of the 3D camera system, the scanner assembly 112 may include the plurality of image sensors 114 that may be configured to capture a plurality of images of different inventory items along with depth information of the different inventory items in an inventory storage system. In addition, in certain embodiments, the scanner assembly 112 includes a guiding mechanism (a programmable or a computer-controlled actuator) and a guidable portion (e.g., an actuator belt, a plate, etc.) mounted on a support frame. The plurality of image sensors 114 may be affixed to the guidable portion and driven along different directions (e.g., along orthogonal axes in a plane) using the guiding mechanism. In such implementations, a position of an image sensor in the scanner assembly 112 at the time of scanning of an inventory item may correspond to a position of the inventory item in the inventory storage system.

In accordance with an embodiment, the plurality of image sensors 114 may be part of the 3D camera system installed in the scanner assembly 112. Each image sensor may be one of a 3D range camera or a 3D stereo vision camera that may be affixed on the guiding portion of the scanner assembly 112. The plurality of image sensors 114 may comprise suitable logic, circuitry, and interfaces that may be configured to capture a plurality of 3D images of a plurality of inventory items stored in different storage bins of the inventory storage system. The 3D image may include RGB-D information of a scene in field-of-view of a corresponding image sensor of the plurality of image sensors 114. In RGB-D information, "RGB" may correspond to red, green, and blue pixel values, whereas "D" may correspond to depth information of an inventory items in the FOV of a corresponding image sensor. The depth information may include distance values from a focal plane of the image sensor to different points on the inventory item. Examples of implementation of the plurality of image sensors 114 may include, but are not limited to, a time of flight (TOF) camera system, a stereo-camera system, a structured-light 3D scanner that utilizes projected-light patterns, a point-wise TOF sensor combined with scanning mechanism, such as Light Detection and Ranging (LiDAR), a Matricial TOF camera, a pulsed-light rotating scanner, a pulsed-light TOF scanner, and a modulated-light TOF scanner.

The robotic manipulator 116 may correspond a manipulator system that may be configured to execute different operations, such as, pick, hold, grab, transfer, sort, put away, or reverse put inventory items from/to the inventory storage system. The robotic manipulator 116 may include the robotic arm 118 coupled to the end effector 120. In certain embodiments, the end effector 120 may be a grabbing or a holding tool detachably attached to the robotic arm 118. The details of such an implementation is described in detail, for example, in FIG. 4B.

The robotic arm 118 may include different functional portions (e.g., arms), movement of which may be maneuvered by a plurality of actuators to guide the end effector 120 to a particular inventory item, which may be detected by the 3D camera system of the scanner assembly 112. The movement of the robotic arm 118 in a 3D space may be restricted by a defined number of degrees of freedom exhibited by different functional portions of the robotic arm 118. Different functional portions may be maneuvered based on machine instructions received from the control server 104 based on optimal position parameters of different inventory items relative to a position (i.e., an origin) of the robotic manipulator 116.

The end effector 120 may be a tool, an assembly, or an apparatus that may be removably attached to one or more free joints on the robotic arm 118. The end effector 120 may be configured to apply different effect mechanisms by use of pneumatic systems, hydraulic systems, or electromechanical systems, to pick, hold, grab, slide, throw, press, shrink, or apply other physical effects on different types of inventory items in the plurality of inventory storage system 106A, . . . , 106N, based on an identification of the inventory items. Examples of the end effector 120 may include, but are not limited to, robotic-grippers, such as electric grippers, vacuum-based grippers (such as suction cups), pneumatic grippers, magnetic grippers, and robotic fingers. In certain embodiments, the end effector 120 may be coupled to an automatic tool changer, which may acts an interface between a flange of the robotic arm 118 (near a free-end of the robotic arm 118) and the end effector 120.

The HMI 122 may comprise suitable logic, circuitry, and interfaces that may be configured to display a simulation of different operations of the identification and planning system 102 in a real time or near-real time. The simulation may be an interactive (e.g., user interactive) 2D or 3D simulation of different functional components, such as the scanner assembly 112 and the robotic manipulator 116, in the warehouse. In the simulation, real time movements and prediction for subsequent movements of different functional components may be further simulated. The HMI 122 may include a display, a processing circuit, a network interface, an input/output (I/O) interface, and/or other circuits.

The communication network 124 may comprise suitable logic, circuitry, and interfaces that may be configured to provide a plurality of network ports and a plurality of communication channels for transmission and reception of data related to operations of the identification and planning system 102. Each network port may correspond to a virtual address (or a physical machine address) for transmission and reception of the communication data. For example, the virtual address may be an Internet Protocol Version 4 (IPV4) (or an IPV6 address) and the physical address may be a Media Access Control (MAC) address. The communication network 124 may be associated with an application layer for implementation of communication protocols based on one or more communication requests from at least one of the one or more communication devices (e.g., I/O devices or HMI 122). The communication data may be transmitted or received, via the communication protocols. Examples of the communication protocols may include, but are not limited to, HTTP (Hypertext Transfer Protocol), FTP (File Transfer Protocol), SMTP (Simple Mail Transfer Protocol), DNS (Domain Network System) protocol, and CMIP (Common Management Interface Protocol).

In accordance with an embodiment, the communication data may be transmitted or received via at least one communication channel of the plurality of communication channels in the communication network 124. The communication channels may include, but are not limited to, a wireless channel, a wired channel, a combination of wireless and wired channel thereof. The wireless or wired channel may be associated with a data standard which may be defined by one of a Local Area Network (LAN), a Personal Area Network (PAN), a Wireless Local Area Network (WLAN), a Wireless Sensor Network (WSN), Wireless Area Network (WAN) and Wireless Wide Area Network (WWAN).

In operation, at a particular time point, the control server 104 may be configured to receive order information associated with fulfillment of one or more orders from an order management server (not shown). The order management server may be part of a supply chain system of the warehouse or may be integrated with an ERP system implemented at the warehouse level or at a warehouse cluster level. The order information may include, but is not limited to, product information (such as, product descriptions, attributes, locations, order quantities), an available-to-promise (ATP) inventory and sourcing details, vendor information, purchase information, order entry and customer service details (e.g., returns and refunds), and payment information (such as credit cards, billing, and payment verification).

The control server 104 of the identification and planning system 102 may be configured to parse the order information and generate a list (or multiple lists) of inventory items to be picked up in a cycle or a batch operation (or multiple cycles) for fulfillment of one or more orders. In order to pick-up and put-away inventory items specified in the received list, the control server 104 may be configured to instruct one or more mobile robots from the plurality of mobile robots 110A, . . . , 110N, deployed in different areas of the warehouse, to reach to different inventory storage systems that have the inventory items specified in the received list of inventory items. The instruction may also include information associated with specific locations (in the warehouse) where different inventory storage systems may be moved by the one or more mobile robots. Such locations may correspond to a dedicated pick stations, where inventory items from different inventory storage systems may be picked (or sorted) and put away (or transferred) to dedicated totes or racks for subsequent operations in pipeline for the one or more orders.

As per the instructions, the one or more mobile robots may be configured to lift up and move an inventory storage system of the plurality of inventory storage systems 106A, . . . , 106N, from a first location (such as an inventory storage area) to a location associated with a pickup station. The pickup station may include the scanner assembly 112 and the robotic manipulator 116 present in a particular region of the pickup station. Alternatively, multiple scanner assemblies and multiple robotic manipulators may be present in a queue or a specific arrangement in order to pick-up multiple inventory items from different inventory storage systems at a time.

The plurality of mobile robots 110A, . . . , 110N may include a first mobile robot 110A that may be configured to move a first inventory storage system 106A in a queue dedicated for the scanner assembly 112 and the robotic manipulator 116 in the pickup station. In accordance with an embodiment, there may be different pickup stations in the warehouse, with each pickup station having the scanner assembly 112 and the robotic manipulator 116.

The queue may correspond to grid regions that may act a dedicated path for movement of different inventory storage systems in the pickup station. The grid of regions may correspond to a plurality of locations that are tagged by a fiducial marker, which may be a physical fiducial marker or a virtual fiducial marker. The first mobile robot 110A may be configured to move the first inventory storage system 106A through the grid regions, where each fiducial marker acts as a stop location for the first mobile robot 110A. In certain scenarios where the queue may be empty, i.e., unoccupied by the different inventory storage systems, each fiducial marker may be ignored as a stop location by the first mobile robot 110A. It is to be understood that the scope of the disclosure, may not be limited to the use of fiducial markers. In some embodiments, fiducial marker may not be used, and other position identification systems may be used. For examples of such position identification systems may include, but are not limited to, indoor position system (IPS), Wi-Fi positioning system (WPS), or other offline or online based geolocation detection systems.

In accordance with an embodiment, the scanner assembly 112 and the robotic manipulator 116 may be located side-by-side and may be placed in front of different grid regions. The control server 104 may be configured to execute, using the plurality of image sensors 114 in the scanner assembly 112, a scanning operation on a first plurality of inventory items in the first inventory storage system 106A. In the scanning operation, the plurality of image sensors 114 may be configured to capture a plurality of 3D images of the first plurality of inventory items. Each 3D image may include RGB-D information about one or more inventory items in field-of-view of an image sensor from the plurality of image sensors 114. The RGB-D information may be used by the control server 104 to detect the first plurality of inventory items in the first inventory storage system 106A.

The control server 104 may be further configured to extract color information and depth information from a 3D image that includes the first inventory item. 3D information may be estimated by the control server 104 for the first inventory item. The 3D information may correspond to different surface attributes of the first inventory item in the first inventory storage system 106A, which may be obtained from a scan of the first plurality of inventory items. The control server 104 may be further configured to determine a first set of position parameters for the first inventory item from the detected first plurality of inventory items, with respect to a position of an image sensor from the plurality of image sensors 114 in the scanner assembly 112. The first set of position parameters may correspond to position values of the first inventory item in terms of 3D Cartesian coordinates. In order to pick up the first inventory item, a pick-path plan may be required to specify different parameters related to movement of the robotic arm 118 and the end effector 120 along with holding mechanism for the first inventory item.

The control server 104 may be configured to generate a plurality of pick-path plans for the first inventory item. Each pick-path plan of the plurality of pick-path plans may correspond to a transformation of the determined first set of position parameters to a second set of position parameters with respect to the robotic manipulator 116 (i.e., an origin of the robotic manipulator 116). Alternatively stated, each pick-path plan may include a set of position values and other grabbing parameters that may be used by the control server 104 to simulate a maneuver of the robotic manipulator to pick (or put away) inventory items (or to) storage racks of a storage system. The first set of position parameters may be spatially different from the second set of position parameters. The spatial differentiation may be caused by difference in position of the scanner assembly 112 and the robotic manipulator 116.

The plurality of pick-path plans may be generated by application of a plurality of transform operations on the determined first set of position parameters to obtain the second set of position parameters. The plurality of transform operations may correspond to iterative modifications in the first set of position parameters (i.e., position values measured with respect to position of an image sensor).

In order to select an optimal pick-path plan (i.e., a first pick-path plan), a test computer-simulation for each pick-path plan of the plurality of pick-path plans may be executed by the control server 104. The test computer-simulation may be further visualized on the HMI 122 communicatively coupled to the control server 104, via the communication network 124. In the test computer-simulation, the control server 104 may be configured to verify a success of the pick operation corresponding to application of each pick-path plan of the generated plurality of pick-path plans. With each transform operation, the position parameters for the robotic manipulator 116 may be adjusted and further rendered in a simulation to check if the robotic arm 118 and the end effector are able to reach and hold the first inventory item from the first inventory storage system 106A. It may be checked whether the end effector 120 (e.g., a pneumatic gripper) is able to successfully grab and hold the first inventory item for a required period, without a fall or a damage to the packaging or the product kept as the first inventory item.

The control server 104 may be further configured to select a first pick-path plan from the generated plurality of pick-path plans. The first pick-path plan may be selected before a pick operation is executed on the first inventory item. In accordance with an embodiment, the control server 104 may be configured to select the first pick-path plan for the first inventory item during an idle state of the scanner assembly 112 and the robotic manipulator 116. The idle state may correspond to a state in which the scanner assembly 112 and the robotic manipulator 116 may be in non-operation state for a particular time period. Thus, the first pick-path plan may be selected at a time when order volume is low to save time when the order volume may go high.

The selection of the first pick-path plan may be based on a success of the pick operation in the test computer-simulation. The success may be determined based on the second set of position parameters corresponding to the first pick-path plan. As the optimal pick-path plan is selected, the control server 104, in the pick operation, may be further configured to control the robotic arm 118 and the end effector 120 to pick the first inventory item from the first inventory storage system 106A, based on the first pick-path plan. More specifically, in the pick-operation, the robotic manipulator 116 further may control a plurality of actuators in the robotic arm 118 to allow a movement of the robotic arm 118 and the end effector 120 within the defined number of degrees of freedom in the 3D space. The operation of the identification and planning system are further described in detail, for example, in FIGS. 2A, 2B, 3, 4A, 4B, 5A, and 5B.

Figure 2A:
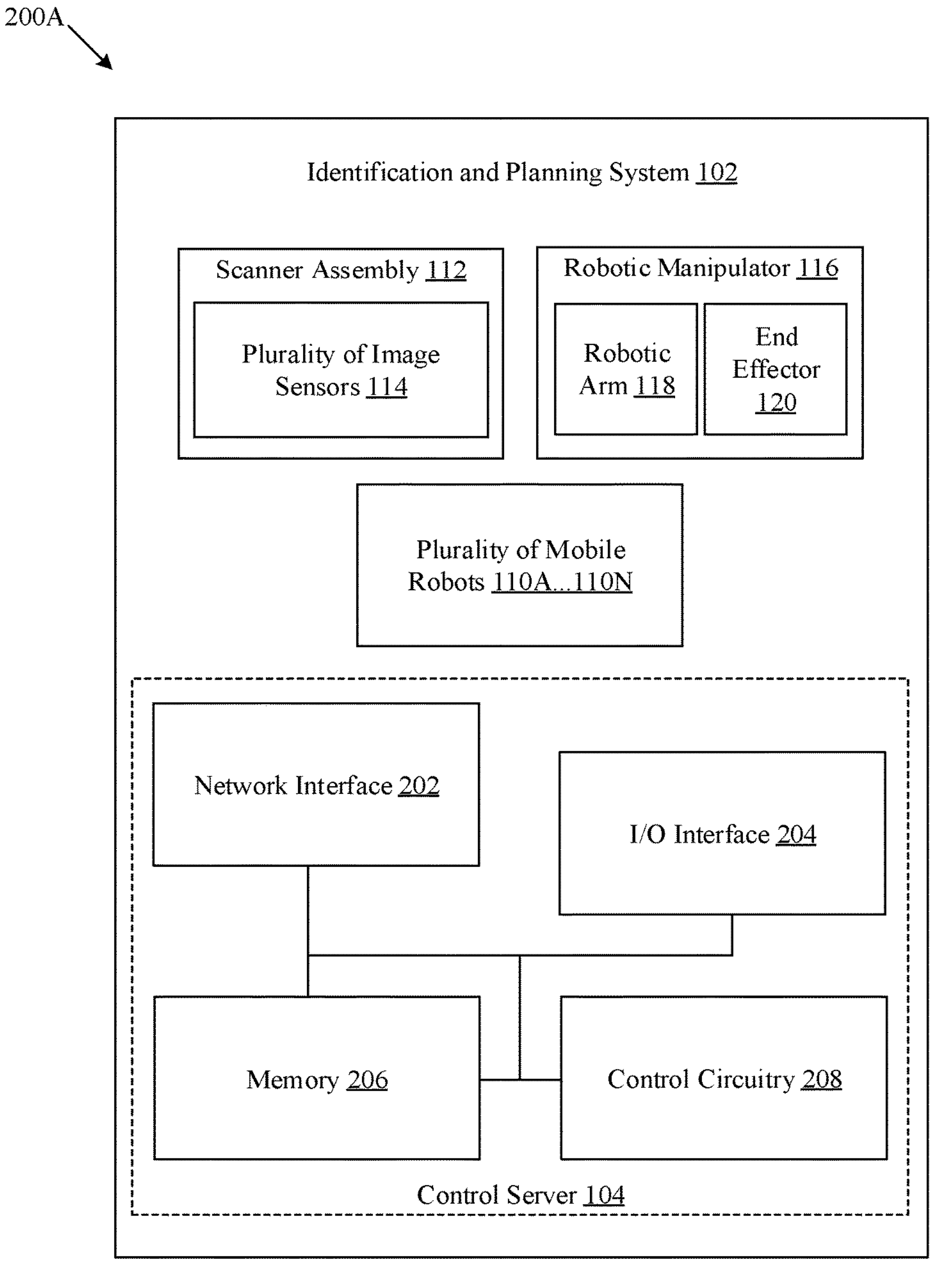
FIG. 2A illustrates a detailed block diagram of the identification and planning system of FIG. 1 for fulfillment of orders, in accordance with an embodiment of the disclosure.

FIG. 2A illustrates a detailed block diagram of the identification and planning system of FIG. 1 for fulfillment of orders, in accordance with an embodiment of the disclosure. FIG. 2A is explained in conjunction with elements from FIG. 1. With reference to FIG. 2A, there is shown a block diagram 200A of the identification and planning system 102. In the block diagram 200A, there is shown an embodiment of the identification and planning system 102 that includes the control server 104 and the plurality of mobile robots 110A, . . . , 110N. The identification and planning system 102 further includes the scanner assembly 112 (which includes the plurality of image sensors 114) and the robotic manipulator 116 (which includes the robotic arm 118 and the end effector 120). The control server 104 includes a network interface 202, an input/output (I/O) interface 204, memory 206, and control circuitry 208.

The network interface 202 may comprise suitable logic, circuitry, and interfaces that may be configured to establish and enable a communication between the control server 104 and different components of the identification and planning system 102, via the communication network 124. The network interface 212 may be implemented by use of various known technologies to support wired or wireless communication of the control server 104 with the communication network 124. The network interface 202 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and a local buffer circuitry.

The I/O interface 204 may comprise suitable logic, circuitry, interfaces, and/or code that may be configured to receive a user input and transmit server outputs via a plurality of data ports in the control server 104. The I/O interface 204 may comprise various input and output data ports for different I/O devices. Examples of such I/O devices may include, but are not limited to, a touch screen, a keyboard, a mouse, a joystick, a microphone, an image-capture device, a liquid crystal display (LCD) screen and/or a speaker.

The memory 206 may comprise suitable logic, circuitry, and interfaces that may be configured to store instructions executable by the control circuitry 208. Additionally, the memory 206 may be configured to receive and store instructions (programmable) from one or more servers or the HMI 122, via the communication network 124. The memory 206 may correspond to a persistent storage and/or a non-persistent storage of the control server 104. Examples of the memory 206 may include, but are not limited to, magnetic storage drive, a solid state drive, Programmable Read Only Memory (PROM), Erasable PROM (EPROM), Electrically EPROM (EEPROM), flash memory. In some embodiments, a set of centralized or distributed network of peripheral memory devices may be interfaced with the control server 104, as an example, on a cloud server.

The control circuitry 208 may comprise suitable logic, circuitry, and interfaces that may be configured to control execution of different operations associated with pickup, put away, or sorting of different inventory items from the plurality of inventory storage systems 106A, . . . , 106N in the warehouse. In addition, the control circuitry 208 may be configured to control execution of different operations associated with replenishment (i.e., to restock empty storage bins) of inventory items in empty (unallocated) storage bins of the plurality of inventory storage systems 106A, . . . , 106N. The control circuitry 208 may be further configured to handle operations, such as order consolidation for different types of inventory items to be picked up in a cycle or an order batch, palletization and/or de-palletization of inventory items, and the like. Some of the operations may include, but are not limited to, inventory profiling, pickup planning and verification for inventory items, and inventory pickup and transfer to pick up stations in the warehouse. Examples of the implementation of the control circuitry 208 may include, but are not limited to, Application-specific Integrated Circuits (ASICs), System-On Chips (SOCs), x86/x64 processors, Reduced Instruction Set (RISC) or Complex Instruction Set (CISC) architecture central processing units (CPUs), Field Programmable Gate Arrays (FPGA), and Programmable Logic Devices (PLDs)/Complex PLDs.

Figure 2B:
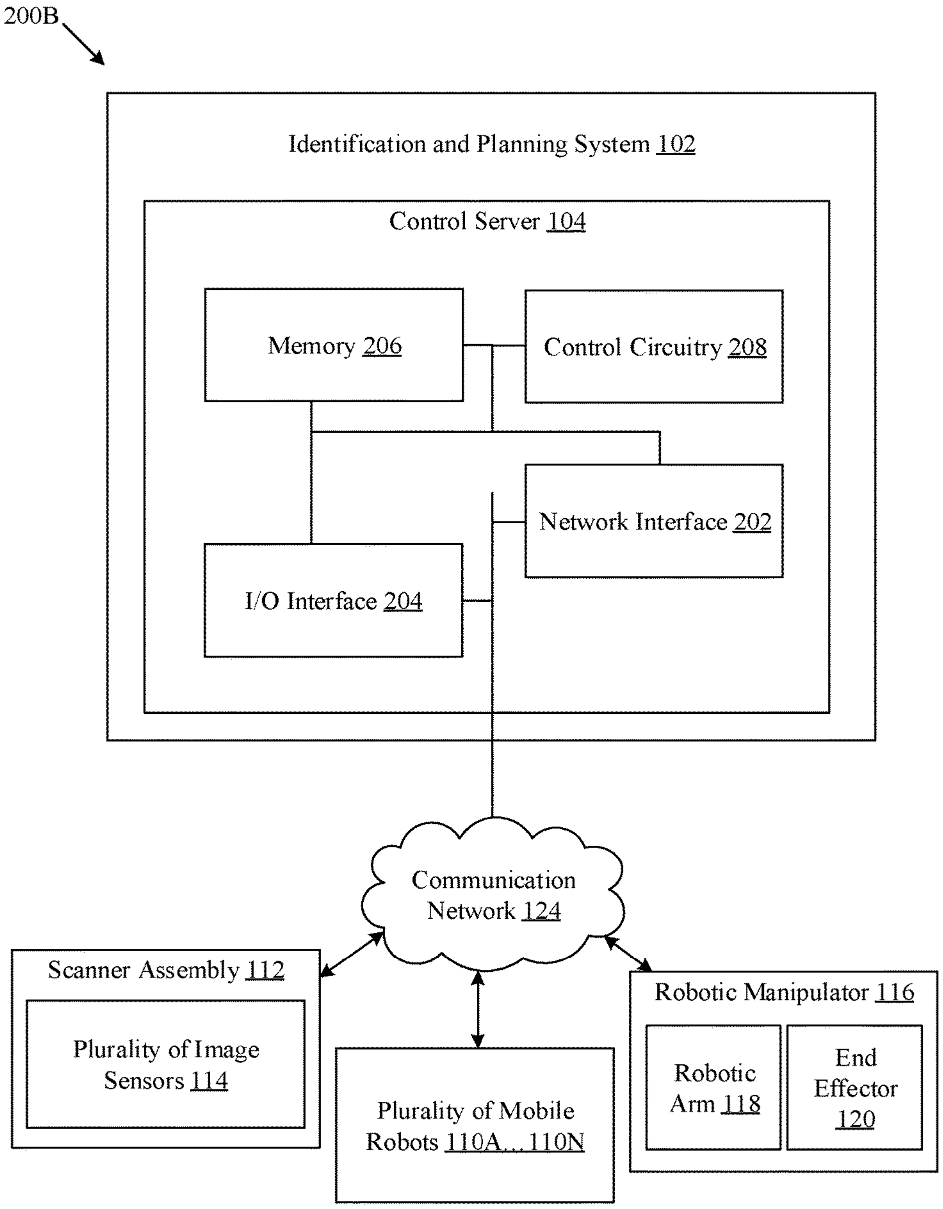
FIG. 2B illustrates a detailed block diagram of the identification and planning system for fulfillment of orders, in accordance with an alternative embodiment of the disclosure.

FIG. 2B illustrates a detailed block diagram of the identification and planning system for fulfillment of orders, in accordance with an alternative embodiment of the disclosure. FIG. 2B is explained in conjunction with elements from FIGS. 1 and 2A. With reference to FIG. 2B, there is shown a block diagram 200B of the identification and planning system 102. In the block diagram 200B, there is shown another embodiment of the identification and planning system 102 that only includes the control server 104. The control server 104 may be centralized cloud application server that may control operations of the plurality of mobile robots 110A, . . . , 110N, the scanner assembly 112, and the robotic manipulator 116, across multiple distribution and fulfillment centers of one or more warehouses. The identification and planning system 102 may be deployed as one of a Software as a Service (SaaS), Platform as a Service (PaaS), or Infrastructure as a Service (IaaS) platform for owned, self-managed, third party, or affiliate fulfillment and distribution centers of warehouses that may cater to different types of businesses, e.g., E-retail, electronics, clothing, grocery, shipping goods, FMCG and the like.

FIG. 3 illustrates an exemplary warehouse scenario that comprises the identification and planning system of FIG. 1, in accordance with an embodiment of the disclosure. FIG. 3 is explained in conjunction with elements from FIGS. 1, 2A, and 2B. With reference to FIG. 3, there is shown an exemplary scenario 300 of a warehouse 302. The warehouse 302 includes an inventory storage area 304, an order packaging area 306, and a server room 308. The warehouse 302 also includes the identification and planning system 102 associated with a pickup station of the warehouse 302. The exemplary warehouse 302 may further include additional operational and non-operational systems, for example, power management system, inventory management system, order processing system, inventory stores, packing stations, and the like. A description of different operational and non-operational systems has been omitted from the disclosure for the sake of brevity.

In the inventory storage area 304, there is shown a plurality of inventory storage systems 310A, . . . , 310N, a robotic manipulator 312, a plurality of palettes of inventory items 314, and a plurality of mobile robots 316. The plurality of inventory storage systems 310A, . . . , 310N may include storage bins that may be initially empty. A put-plan may be generated by the control server 104 to pick up different inventory items from one or more palettes of the plurality of palettes of inventory items 314 and place the picked up inventory items into storage bins allocated to the picked up inventory items.

In accordance with an embodiment, different inventory items (e.g., stored as palettes) may be allocated to different storage bins of the plurality of inventory storage systems 310A, . . . , 310N, based on a smart allocation scheme. In the smart allocation scheme, inventory items that have a high demand (based on historical order information and/or current order information) or may have higher demand as per demand forecasts, prediction methods, or supply chain sources, may be populated first in the plurality of inventory storage systems 310A, . . . , 310N.

In accordance with another embodiment, the allocation of the inventory items may be decided based on a pipeline of orders that still need to be processed by the fulfillment and distribution centers of the warehouse 302. More specifically, only order-specific inventory items may be initially stocked up in available storage bins of the plurality of inventory storage systems 310A, . . . , 310N and remaining storage bins may be replenished with other inventory items, such as frequently-ordered inventory items.

The robotic manipulator 312 may be also part of a put system that may be configured to replenish different storage bins of the plurality of inventory storage systems 310A, . . . , 310N with a plurality of inventory items. The robotic manipulator 312 may include a robotic arm (e.g., the robotic arm 118) and an end effector (e.g., the end effector 120, such as a pneumatic gripper or a holding tool). The functions of the robotic manipulator 312 may be similar to that of the robotic manipulator 116 of the identification and planning system 102. However, the robotic manipulator 312 may execute put operations, in which an inventory item may be picked up from a storage unit, such as a pallet, and placed in a storage bin allocated for the inventory item. Thus, instead of pickup of inventory items from storage bins and put away into racks or totes, the robotic manipulator 312 may execute reverse put operation that are further described in detail, for example, in FIGS. 6A and 6B.

The inventory storage area 304 may further include the plurality of mobile robots 316, which may be controlled based on instructions received from one or more control servers in the server room 308. Based on requirements, the plurality of mobile robots may be configured to lift up and transfer one or more inventory storage systems (e.g., two different inventory storage systems 318) of the plurality of inventory storage systems 310A . . . 310N, from the inventory storage area 304 to an area associated with the identification and planning system 102.

In the identification and planning system 102, a first mobile robot 320A and a second mobile robot 320B may be configured to place a first inventory storage system 322A and a second inventory storage system 322B at specified positions in a defined queue (represented by dotted lines). A scanner assembly 324 and a robotic manipulator 326 may be located at specified distinct positions in the defined queue. A crate 328 may be present in vicinity and reach of the robotic arm of the robotic manipulator 326 to store auto-pickable items and manually pickable items (e.g., through order consolidation) from the first inventory storage system 322A and the second inventory storage system 322B. The one or more control servers (e.g., a control server 330) in the server room 308 may be configured to execute a scanning operation followed by a pick operation on inventory items of the first inventory storage system 322A and the second inventory storage system 322B, respectively. The scanning operation is executed prior to the pick operation to avoid delays in pickup of inventory items, whereas in conventional solutions, the execution of the pick operation may be kept on hold while the scanning operation is executed. This may lead to an increase in response time and movement of a robotic manipulator in a conventional system. From the pickup station, a third mobile robot 320C may be configured to carry put away (or sorted) inventory items in the crate 328 to the order packaging area 306. Alternatively, a conveyor or other transfer mechanisms may be implemented to transfer the inventory items in the crate 328 to the order packaging area 306. Multiple crate-loaded mobile robots 332 may arrive in the order packaging area 306 to transfer the crates (e.g., the crate 328) of inventory items to a packaging station 334. At the packaging station 334, inventory items may be packed and further processed for fulfillment of multiple orders in pipeline of the entire supply chain system.

The server room 308 may be a centralized (or a decentralized/distributed) server room, which may include the control server 330 deployed to control partially or fully the operations of the identification and the planning system 102. The server room 308 may further include a support server 336 to control remaining operations associated with guided movement of the mobile robots, inventory profiling, put operations in the inventory storage area, or packaging-related operations. The warehouse 302 is an exemplary warehouse that depicts a particular setup of warehouse, in which the proposed identification and planning system 102 may be deployed to achieve a desired throughput and cycle time for pick up and put away of inventory items. However, the scope of the disclosure may not be so limited and the identification and planning system 102 may be integrated and/or deployed with different types of warehouses, irrespective of size, weight, order traffic, or a type of goods handled by such warehouses.

Figure 4A:
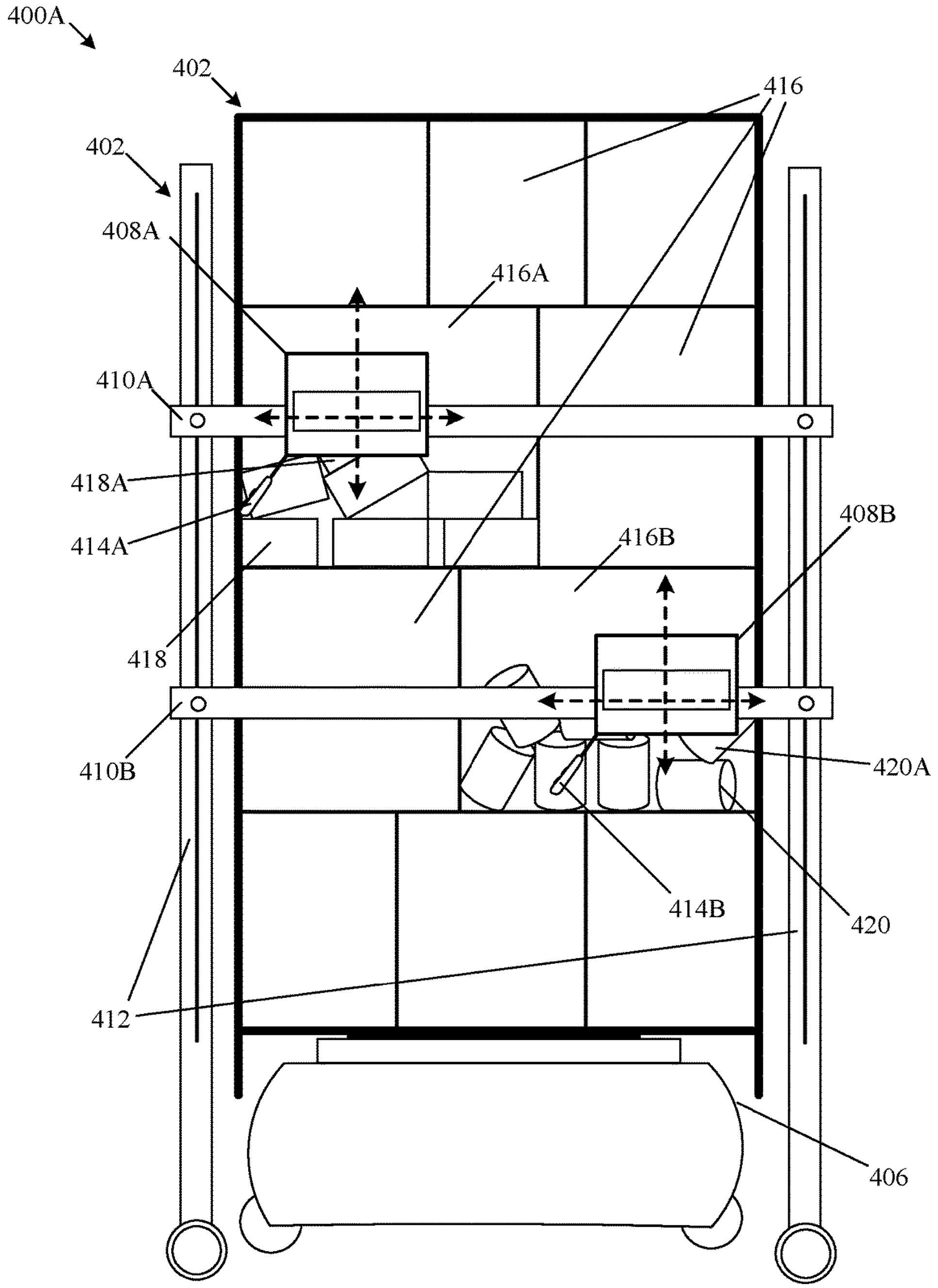
FIG. 4A illustrates an exemplary inventory storage system placed in front of a scanner assembly for detection of inventory items from the inventory storage system, in accordance with an embodiment of the disclosure.

FIG. 4A illustrates an exemplary scanner assembly and an exemplary inventory storage system placed in front of the scanner assembly for detection of inventory items from the inventory storage system, in accordance with an embodiment of the disclosure. FIG. 4A is explained in conjunction with elements from FIGS. 1, 2A, 2B, and 3. With reference to FIG. 4A, there is shown a view 400A of a scanner assembly 402 and an inventory storage system 404 mounted as a payload on a mobile robot 406.

The scanner assembly 402 may be a 3D camera system for detection and identification of different inventory items at respective positions in the inventory storage system 404. The scanner assembly 402 includes a first image sensor unit 408A and a second image sensor unit 408B that may be affixed (or detachably attached) to a guidable portion, i.e., a first horizontal support plate 410A and a second horizontal support plate 410B, respectively. The first image sensor unit 408A and the second image sensor unit 408B may be driven along different directions, such as vertical and horizontal directions, using a guiding mechanism (not shown) and guidable portions. The guiding mechanism may be a programmable or a computer-controlled actuator. Similarly, the guidable portion may include an actuator belt, the first horizontal support plate 410A, and the second horizontal support plate 4106. The first horizontal support plate 410A and the second horizontal support plate 410B may be mounted on a vertical support frame 412.

For example, the first image sensor unit 408A and the second image sensor unit 408B may slide in a horizontal direction (left and right) on the first horizontal support plate 410A and the second horizontal support plate 410B, respectively, based on a belt that is driven by an actuator (e.g., a linear actuator or a rotary actuator). Alternatively, the first image sensor unit 408A and the second image sensor unit 408B may slide in a vertical direction (top and bottom) along the vertical support frame 412.

The first image sensor unit 408A and the second image sensor unit 408B may include a first 3D camera and a second 3D camera enclosed in a first protective support portion and a second protective portion, respectively. A first calibration camera 414A and a second calibration camera 414B may be further affixed on the first protective portion and the second protective portion, respectively. The first calibration camera 414A and the second calibration camera 414B may be affixed at an inclination with the first protective support portion and the second protective portion, such that the robotic manipulator (such as the robotic manipulator 116) may lie in a field-of-view (FOV) of the first calibration camera 414A and the second calibration camera 414B.

As shown as an example, the inventory storage system 404 may include a plurality of storage bins 416. At a particular time point in the scanning operation, the first image sensor unit 408A may be present in front of a first storage bin 416A and the second image sensor unit 408B may be present in front of a second storage bin 416B. The first storage bin 416A and the second storage bin 416B may accommodate a first set of inventory items 418 and a second set of inventory items 420, respectively. Each inventory item in the first set of inventory items 418 and the second set of inventory items 420 may be arranged in different ways, such as side-by-side stacking of inventory items or vertical stacking of inventory items. Inventory items in the first set of inventory items 418 or the second set of inventory items 420 may be homogenous (or same type of inventory items, e.g., milk packets from a Brand A) or non-homogenous inventory items that may belong to a common product category or multiple product categories. For example, the first set of inventory items 418 or the second set of inventory items 420 may be milk products from same brand (i.e., visually indistinguishable as a different product) or a mix of biscuits packets and vegetable oil bottles (i.e., visually distinguishable as a different product).

At a particular time frame, the first 3D camera and the second 3D camera may be configured to capture 3D images of a first inventory item 418A and a second inventory item 420A in the first storage bin 416A and the second storage bin 416B, respectively, of the inventory storage system 404. The position of the first 3D camera and the second 3D camera in the scanner assembly 402 at the time of scanning of the first inventory item 418A and the second inventory item 418B may correspond to a position of the first inventory item 418A and the second inventory item 418B, respectively, in the inventory storage system 404.

The control server 104 may be configured to detect the first inventory item 418A in the first storage bin 416A, based on an image processing technique. Examples of the image processing technique may include, but are not limited to, as template matching, Scale Invariant Feature Transform (SIFT)-based object detection, Speeded-Up Robust Features (SURF), Binary Robust Independent Elementary Features (BRIEF), Oriented Fast and Rotated Brief (ORB), Binary Robust Invariant Scalable Key points (BRISK), or SKU identification. The control server 104 may be further configured to determine a first set of position parameters (x, y, z values) for the first inventory item 418A with respect to a position of the first 3D camera. The first set of position parameters (x, y, z values) may be determined based on registration of a position (i.e., (x, y) values) of the first 3D camera and a distance (z) by which the focal plane of the first 3D camera is separated from a point on the first inventory item 418A.

The first calibration camera 414A and the second calibration camera 414B may be configured to capture images of the robotic manipulator 116 at known position values (i.e., x", y", z", and θ) of the first calibration camera 414A and/or the second calibration camera 414B. The control server 104 may be configured to estimate and register a relative difference between position values of the robotic manipulator 116 and the known position values (i.e., x", y", z", and θ) of the first calibration camera 414A or the second calibration camera 414B. The registered relative difference may be used to transform the first set of position parameters (x, y, z) to a second set of position parameters (i.e., x', y', z', roll (r'), yaw (y"), and pitch (p')), where roll, yaw, and pitch correspond to axes of rotation of the robotic arm (e.g., the robotic arm 118) in 3D space. The first set of position parameters (x, y, z values) may be spatially different from the second set of position parameters (i.e., x', y', z', r', y", and p'). Such spatial differentiation may be caused by difference in position of the scanner assembly 402 and the robotic manipulator 116. The operation of the control server 104 for pick-path planning, verification, and execution of the pick operation is further described in detail, for example, in FIGS. 5A and 5B.

Figure 4B:
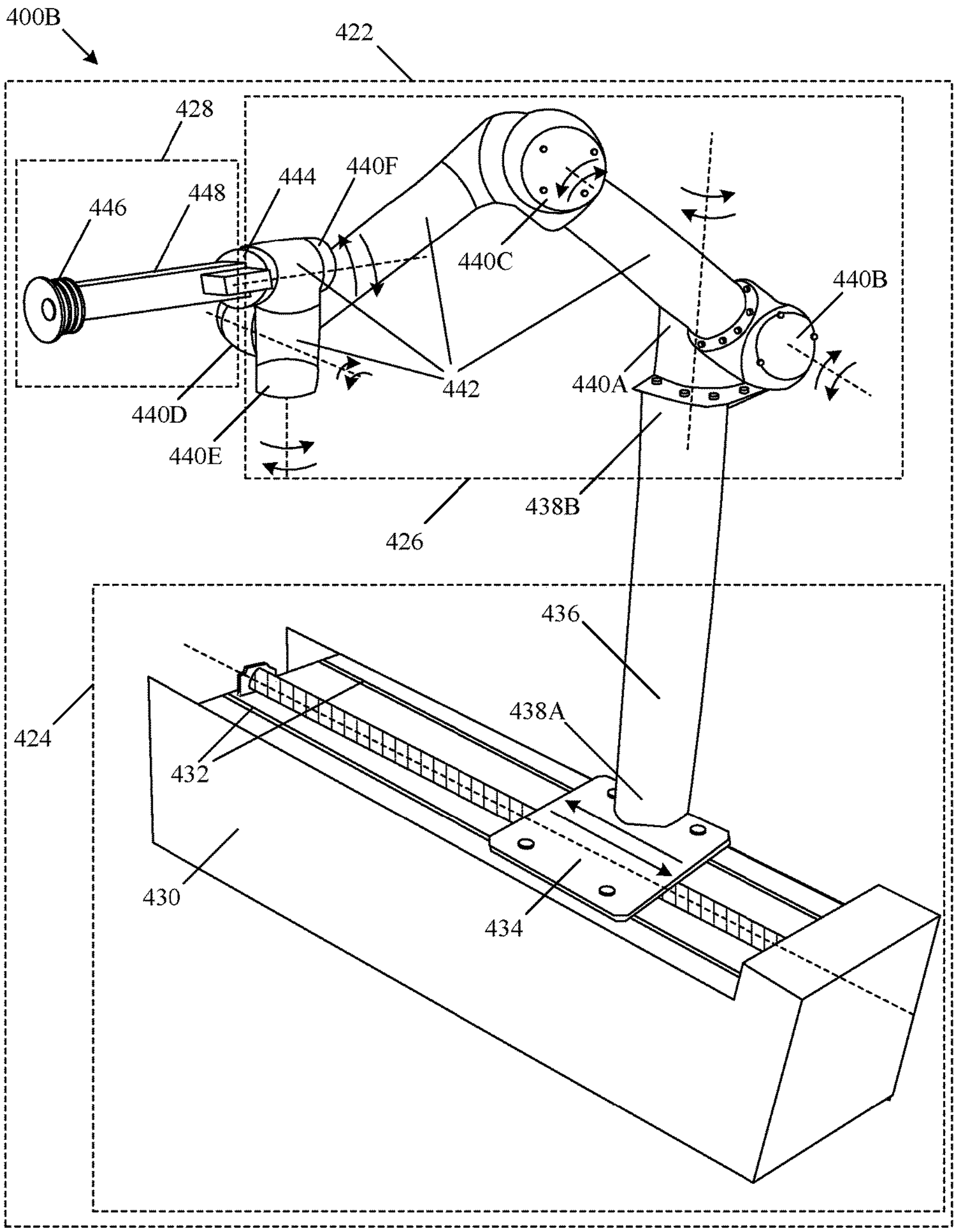
FIG. 4B illustrates an exemplary robotic manipulator that executes a pick operation on different inventory items in an inventory storage system based on an optimal pick-path plan, in accordance with an embodiment of the disclosure.

FIG. 4B illustrates an exemplary robotic manipulator that executes a pick operation on different inventory items in the inventory storage system based on an optimal pick-path plan, in accordance with an embodiment of the disclosure. FIG. 4B is explained in conjunction with elements from FIGS. 1, 2A, 2B, 3, and 4A. With reference to FIG. 4B, there is shown a view 400B of a robotic manipulator 422. The robotic manipulator 422 may include a base support portion 424, a robotic arm 426, and an end effector 428.

The base support portion 424 includes an enclosure 430 that accommodates a guide rail 432 and a carriage 434 mounted on the guide rail 432. A linear actuator mechanism (not shown) may be installed in the enclosure 430 to linearly displace the carriage 434 back and forth (e.g., in a straight line) along the guide rail 432. The control server 104 may be configured to transmit instructions related to displacement of the carriage 434 along the guide rail 432. The carriage 434 also supports a column 436. The carriage 434 is affixed at a first distal end 438A of the column 436 and the robotic arm 426 is mounted at a second distal end 438B of the column 436, as shown in an example.

The robotic manipulator 422 further includes a plurality of actuators 440A, 440B, 440C, 440D, 440E, and 440F in the robotic arm 426. The plurality of actuators 440A, 440B, 440C, 440D, 440E, and 440F may be present between two consecutively placed arm portions of a plurality of arm portions 442 in the robotic arm 426. The plurality of actuators 440A, 440B, 440C, 440D, 440E, and 440F may enable movement of different arm portions of the plurality of arm portion 442 along a defined number of degrees of freedom, such as six degrees of freedom (represented by arrows and a dotted axis line). Alternatively, each actuator from the plurality of actuators 440A, 440B, 440C, 440D, 440E, and 440F may be a rotary actuator that may be activated separately to swivel a coupled arm portion along an axis of rotation (i.e., one of a roll, yaw, or a pitch) while keeping other arm portions static.

At a free end 444 of the robotic arm 426 (i.e., an arm portion coupled to an actuator 440F), an automatic tool changer (not shown) may be coupled to the arm portion at the free end 444. The control server 104 may be configured to control the automatic tool changer to reduce cycle times by automatically switching between different types of end effectors adaptively based on detection of a type of inventory item or an inventory profile of an inventory item in the scanning operation.

As shown, the end effector 428 may be a pneumatic gripper or holding tool having a suction cup 446 and a gripper arm 448 attached to the free end 444 of the arm portion. The end effector 428 may be a specific type of gripper suitable for a type of inventory item accommodated in the inventory storage system 404 (shown in FIG. 4A). The operation of the robotic manipulator 422 is further described in detail, for example, in FIGS. 5A, 5B, 6A, and 6B.

Figure 5A:
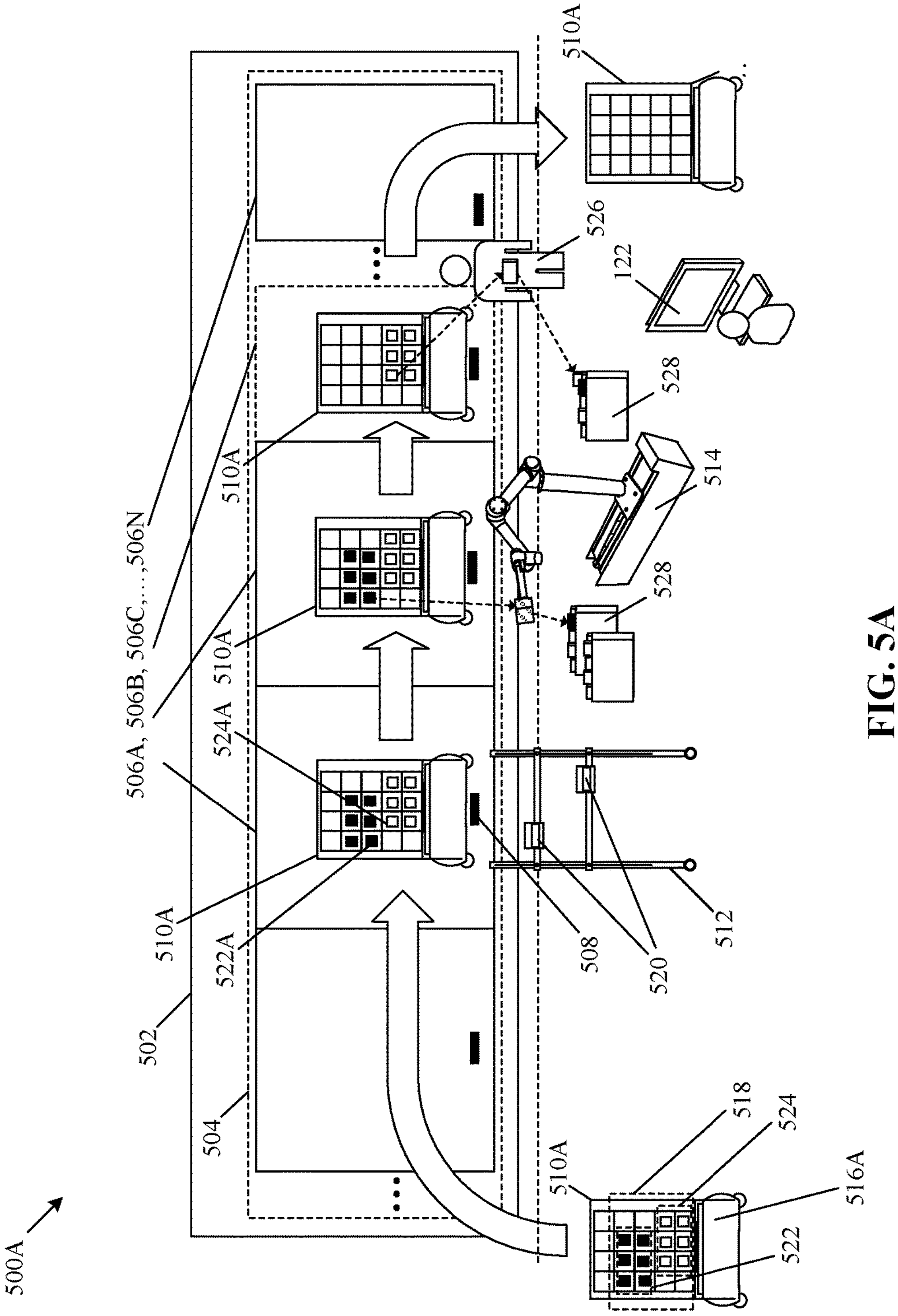
FIG. 5A illustrates a first scenario for sequential execution of a scanning operation, a pick operation, and an order consolidation for inventory items accommodated in an inventory storage system, in accordance with an embodiment of the disclosure.

FIG. 5A illustrates a first scenario for sequential execution of a scanning operation, a pick operation, and an order consolidation for inventory items accommodated in an inventory storage system, in accordance with an embodiment of the disclosure. FIG. 5A is explained in conjunction with elements from FIGS. 1, 2A, 2B, 3, 4A, and 4B. With reference to FIG. 5A, there is shown a first scenario 500A.

In the first scenario 500A, there is shown a queuing station 502 that includes a defined queue 504. The defined queue includes grid regions 506A, 506B, 506C, . . . , 506N. Each grid region from the grid regions 506A, 506B, 506C, . . . , 506N may be associated with a physical space allocated in the warehouse (such as the warehouse 302). The physical space may be marked by a fiducial marker 508. A first inventory storage system 510A may be moved from an inventory storage area (such as the inventory storage area 304) to a pick area. In the pick area, a scanner assembly 512 and a robotic manipulator 514 are installed for execution of a scanning operation and a pick operation on different inventory items in the first inventory storage system 510A. The scanner assembly 512 and the robotic manipulator 514 may be functionally similar to the scanner assembly 402 and the robotic manipulator 422 of FIGS. 4A and 4B, respectively.

As shown, in an exemplary case, the scanner assembly 512 may be positioned in front of a first grid region 506A of the grid regions 506A, 506B, 506C . . . and 506N and the robotic manipulator 514 may be positioned in front of a second grid region 506B of the grid regions 506A, 506B, 506C, . . . , 506N.

The control server 104 (that includes the control circuitry 208) may be configured to execute a queuing operation on the first inventory storage system 510A prior to an execution of the pick operation. In the queuing operation, the control server 104 may be configured to control a first mobile robot 516A to position the first inventory storage system 510A in the defined queue 504 of the queuing station 502. Alternatively stated, the first mobile robot 516A may be configured to position the first inventory storage system 510A in different grid regions based on detection of the fiducial marker 508. The fiducial marker 508 may act as a reference marker for the first mobile robot 516A to correct alignment and placement of the first inventory storage system 510A in front of the scanner assembly 512 or the robotic manipulator 514.

In the queuing operation, the control server 104 may be further configured to control the first mobile robot 516A to move the first inventory storage system 510A through the grid regions 506A, 506B, 506C, . . . , 506N of the defined queue 504. Alternatively stated, the first inventory storage system 510A may be moved from one grid region to another in a sequence that depends on a position of the scanner assembly 512 and the robotic manipulator 514. The first inventory storage system 510A may be moved for execution of the pick operation on a first inventory item stored within the first inventory storage system 510A in the defined queue 504 after the scanning operation is completed and a first pick-path plan is selected for the robotic manipulator 514.

The first inventory storage system 510A may include a first plurality of inventory items 518 accommodated in storage bins of the first inventory storage system 510A. Each of the first plurality of inventory items 518 may be associated with a unique identifier that corresponds to a stock keeping system (SKU). The SKU for each inventory item may be a unique code that is physically readable, electronically readable, or both by a plurality of image sensors 520 of the scanner assembly 512. For example, SKU may be a bar code, a passive printable or attachable radio frequency (RF) tag, a QR code, and the like. Prior to the scanning operation, the control server 104 may be configured to segregate the first plurality of inventory items 518 into a first set of inventory items 522 and a second set of inventory items 522. The segregation of the first plurality of inventory items may be done based on the unique tag (or the SKU) for each of the first plurality of inventory items 516. As shown, the first set of inventory items 522 includes a first inventory item 522A (i.e., an auto-pickable inventory item) and the second set of inventory items 524 includes a second inventory item 524A manually pickable by a warehouse operator 526.

Initially, the first inventory storage system 510 may be present in the first grid region 504A (e.g., above the fiducial marker 506). The control server 104 may be configured to execute, using the plurality of image sensors 520 of the scanner assembly 512, the scanning operation on the first plurality of inventory items 518 in the first inventory storage system 510A. In the scanning operation, the plurality of image sensors 520 may be configured to capture a plurality of 3D images of the first plurality of inventory items 516. Each 3D image may include RGB-D information about one or more inventory items in field-of-view of an image sensor from the plurality of image sensors 520. The RGB-D information may be used by the control server 104 to detect the first plurality of inventory items 518 in the first inventory storage system 510A.

In order to pick up the first inventory item 522A, the control server 104 may be configured to extract color information and depth information from a 3D image that includes the first inventory item 522A. 3D information may be estimated by the control server 104 for the first inventory item 522A. The 3D information may correspond to different surface attributes of the first inventory item 522A in the first inventory storage system 510A, which may be obtained from on a scan of the first plurality of inventory items 516. Different surface attributes may be estimated to identify optimal position values and different parameters (e.g., grip values, pressure values, and a type of gripper). The optimal position values and different parameters may be required by the robotic manipulator 514 to pick the first inventory item 522A with a least possibility of a fall or damage to the first inventory item 522A during pickup and put-away of the first inventory item 522A in totes or racks, such a rack 528.

The control server 104 may be further configured to determine a first set of position parameters for the first inventory item 522A from the detected first plurality of inventory items 516, with respect to a position of an image sensor from the plurality of image sensors 520 in the scanner assembly 512. The first set of position parameters may correspond to position values of the first inventory item 522A in terms of 3D Cartesian coordinates. The first two coordinates may be represented by x-y position values of the image sensor in front of the first inventory item 522A and a third coordinate may be represented by a z-distance value between the focal plane of the image sensor and a point on the first inventory item 522A.

During movement of the first inventory storage system 510A, different inventory items may get affected by vibrations, pull forces, or push forces due to sudden turns, changes in elevation, (abrupt) changes in movement speed, or other factors. Such factors may cause non-uniform orientation or misalignment of the inventory items with each other in different storage bins of the first inventory storage system 510A. This may further cause an error in determination of appropriate pickup parameters (e.g., grip parameters and position parameters) for the robotic manipulator 514, due to uncertainty (as depicted in FIG. 4A) in orientation of different inventory items. Thus, the control server 104 may be configured to estimate an orientation of the first inventory item 522A (and/or other auto-pickable inventory items) in the first inventory storage system 510A. The estimated orientation (e.g., 30 degree tilted right from a vertical) may be used to adjust appropriate pickup parameters for a robotic arm (e.g., the robotic arm 426) and an end effector (e.g., the end effector 428) of the robotic manipulator 514. This may further help in accurate maneuver of the end effector to reach, hold and put-away the first inventory item 522A into a tote or a rack, such as the rack 528.

The control server 104A may be configured to collect and store a set of attributes of the first inventory item 522A prior to the execution of the scanning operation. For example, the set of attributes of the first inventory item 522A may be collected and stored at a time of execution of a put-operation for replenishing empty storage bins of the first inventory storage system 510A. In the scanning operation, the control server 104 may be further configured to retrieve the set of attributes associated with the first inventory item 522A. The set of attributes may include, but are not limited to, size, a Stock Keeping Unit (SKU) identifier, a shape, a price, a degree of fragility, a type of packaging, a type of product material, an order-related, customer-specified, or supply-chain constraint for the first inventory item 522A. The control server 104 may be further configured to estimate a set of grip parameters associated with the end effector of the robotic manipulator 514, based on the retrieved set of attributes of the first inventory item 522A. Examples of the set of grip parameters may include, but are not limited to, grip force/pressure per suction cup, number of suction cups, type of gripper (suction cup, magnetic gripper, or pneumatic or actuator-based gripper hands), and a size of gripper.

In order to pick up the first inventory item 522A, an optimal pick-path plan may be required to specify different parameters related to movement of the robotic arm and the end effector for the first inventory item 522A. The control server 104 may be configured to generate a plurality of pick-path plans for the first inventory item 522A. Each pick-path plan of the plurality of pick-path plans may correspond to a transformation of the determined first set of position parameters (x, y, z) to a second set of position parameters ($x_1$, $y_1$, $z_1$, roll, yaw, pitch) with respect to the robotic manipulator 514 (i.e., an origin of the robotic manipulator 514). The plurality of pick-path plans may be generated by application of a plurality of transform operations on the determined first set of position parameters (x, y, z) to obtain the second set of position parameters ($x_1$, $y_1$, $z_1$, roll, yaw, pitch). In accordance with an embodiment, the plurality of transform operations may correspond to iterative modifications in the first set of position parameters (i.e., position values measured with respect to an image sensor) based on the estimated 3D surface information and the estimated orientation of the first inventory item. The control server 104 may utilize the retrieved set of attributes as supplementary information to the 3D information obtained from the 3D scans of the different inventory items to generate the plurality of pick path plans.

In order to select the optimal pick-path plan (i.e., a first pick-path plan) from the generated plurality of pick-path plans, a test computer-simulation for each pick-path plan of the plurality of pick-path plans may be executed by the control server 104. The test computer-simulation may be further visualized on the HMI 122 that may be communicatively coupled to the control server 104, via the communication network 124. In the test computer-simulation, the control server 104 may be configured to verify a success of a pick operation corresponding to application of each pick-path plan of the generated plurality of pick-path plans. In one implementation, the success of a pick operation may be verified by simulating execution of the pick operation corresponding to the application of each transform operation of the plurality of transform operations on the determined first set of position parameters. Alternatively stated, in each transform operation, the position parameters for the robotic manipulator 514 may be adjusted and further rendered in a simulation to check if the robotic arm and the end effector are able to reach and hold the first inventory item 522A from the first inventory storage system 510A. Also, in the test computer-simulation, the success of the pick operation of the first inventory item 522A may be further verified by execution of the pick operation with a plurality of modifications in the estimated set of grip parameters.

As an example, in the simulation, the grip parameters may be pressure values that may be modified in a recurrent manner. Further, it may be checked whether the end effector (e.g., a pneumatic gripper) is able to successfully grab and hold the first inventory item for a required period, without a fall or a damage to the packaging or the product, referred to as the first inventory item 522A. In the test simulation, the success of the pick operation may correspond to an event in the test computer-simulation, in which a simulation of the robotic manipulator 514 picks the first inventory item 522A using a simulated movement of the plurality of actuators (e.g., the plurality of actuators 440A, 440B, 440C, 440D, 440E, and 440F). The simulated movement may be based on a defined number of degrees of freedom of the robotic arm and the second plurality of position parameters of a pick-path plan (e.g., an optimal pick-path plan).

The control server 104 may be further configured to select a first pick-path plan from the generated plurality of pick-path plans as an optimal pick-path plan. The first pick-path plan may be selected before the pick operation is executed on the first inventory item 522A. The selection of the first pick-path plan may be based on the success of the pick operation in the test computer-simulation. The success may be verified based on the second set of position parameters corresponding to the first pick-path plan.

In the pick operation, the control server 104 may be further configured to control the robotic arm and the end effector of the robotic manipulator 514, to pick up the first inventory item 522A from the first inventory storage system 510A, based on the first pick-path plan. More specifically, in the pick-operation, the robotic manipulator 514 may control the plurality of actuators in the robotic arm to allow a movement of the robotic arm and the end effector within the defined number of degrees of freedom in the 3D space. The defined number of degrees of freedom may be six degrees of freedom along with horizontal displacement of the robotic manipulator 514 along a guide rail (e.g., the guide rail 432).

In accordance with an embodiments, the control server 104 may be further configured to check if order consolidation is required in the cycle (i.e., a cycle to pick inventory items for an order or an order batch). The check for order consolidation may be executed prior to the pick operation (e.g., at the time of the scanning operation on different inventory items in the first inventory storage system 510A). In order consolidation, inventory items, segregated at the inventory storage area on the basis of different attributes, such as fragility, price, or shape, into manually pickable inventory items, may be picked up by warehouse workers (such as, the warehouse operator 526) and put into the totes or racks, such as the rack 528. In certain embodiments, in case order consolidation is required, the control server 104 may be configured to display information on multiple pick-put-to-light (PPTL) devices (not shown) placed on the storage bins of first inventory storage system 510A. The information (e.g., SKU identifier) may be displayed to facilitate the directed picking, put away, and sorting of manually pickable inventory items from a third grid region 506C of the defined queue 504. This may help operator minimize errors, speed up the cycle and improve order processing accuracy while improving overall productivity of the warehouse workers.

Figure 5B:
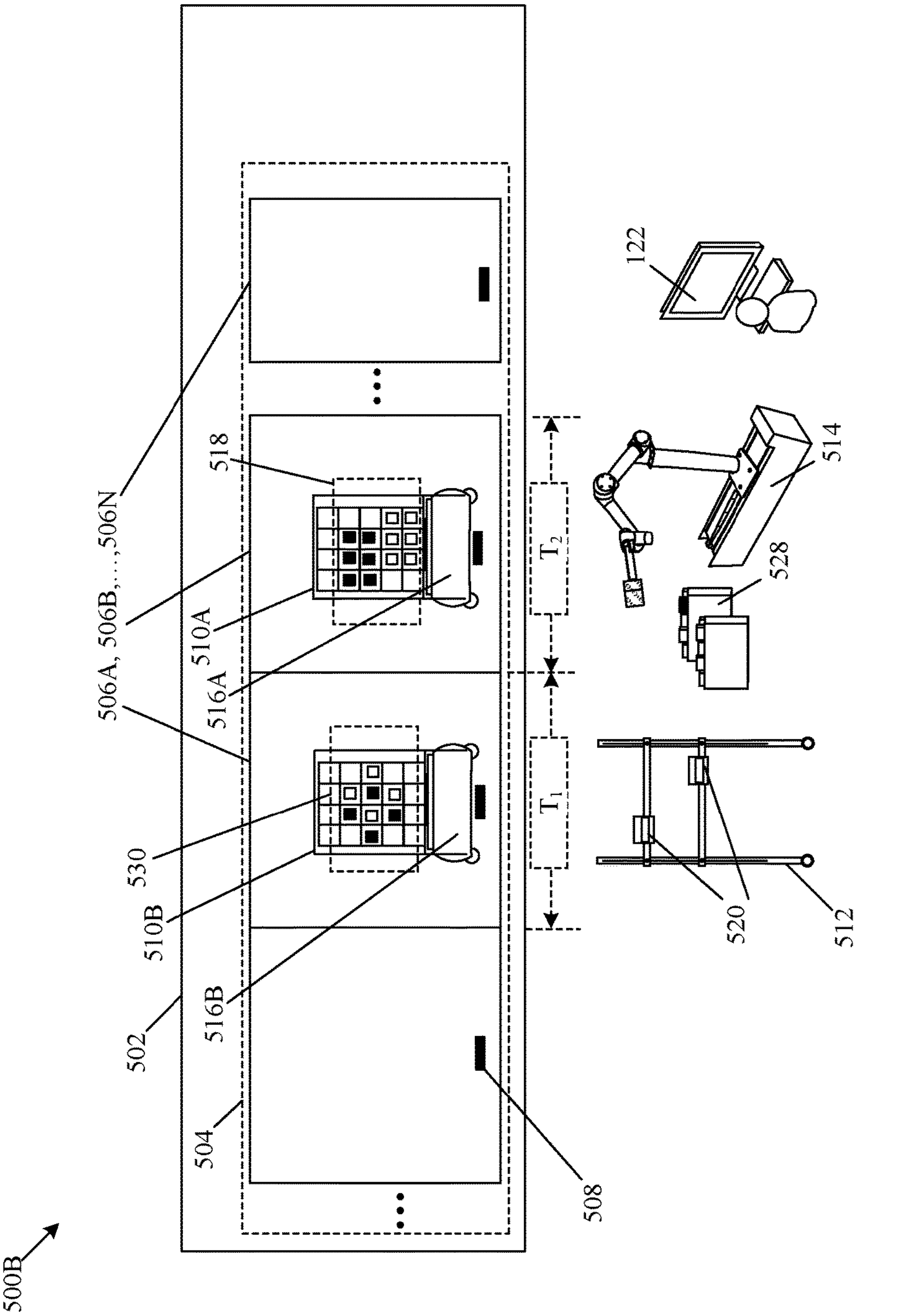
FIG. 5B illustrates a second scenario for timed execution of scanning operation and pick operation for a queue of different inventory storage systems, in accordance with an embodiment of the disclosure.

FIG. 5B illustrates a second scenario for timed execution of scanning operation and pick operation for a queue of different inventory storage systems, in accordance with an embodiment of the disclosure. FIG. 5B is explained in conjunction with elements from FIGS. 1, 2A, 2B, 3, 4A, 4B, and 5A. With reference to FIG. 5B, there is shown a second scenario 500B.

In the second scenario 500B, there is shown the queuing station 502 that includes the defined queue 504. The defined queue includes grid regions 506A, 506B, . . . , 506N. The first inventory storage system 510A and a second inventory storage system 510B may be moved by the first mobile robot 516A and a second mobile robot 516B, respectively, from an inventory storage area (such as the inventory storage area 304) to a pick area. In the pick area, the scanner assembly 512 and the robotic manipulator 514 may be installed for execution of the scanning operation and the pick operation. As an exemplary case, the scanner assembly 512 may be positioned in front of a first grid region 506A of the grid regions 506A, 506B, . . . , 506N and the robotic manipulator 514 is positioned in front of a second grid region 506B of the grid regions 506A, 506B, . . . , 506N.

Prior to execution of the scanning operation, the control server 104 (that includes the control circuitry 208) may be configured to execute a queuing operation on the first inventory storage system 510A and the second inventory storage system 510B. In the queuing operation, the control server 104 may be configured to control the first mobile robot 516A and the second mobile robot 516B to position the first inventory storage system 510A and the second inventory storage system 510B, respectively, in the defined queue 504 of the queuing station 502. Alternatively stated, the first mobile robot 516A may be configured to position the first inventory storage system 510A and the second inventory storage system 510B in the first grid regions 506A and the second grid region 506B, respectively, based on detection of the fiducial marker 508. The fiducial marker 508 may act as a reference marker for the first mobile robot 516A and the second mobile robot 516B to correct alignment and placement of the first inventory storage system 510A and the second inventory storage system 5106, respectively, in front of the scanner assembly 512 or the robotic manipulator 514.

In accordance with an embodiment, the control server 104 may be configured to execute the pick operation on the first inventory item 522A of the first inventory storage system 510A in parallel with the scanning operation on a second plurality of inventory items 530 in one or more storage bins of the second inventory storage system 5106. The first inventory storage system 510A and the second inventory storage system 5106 may be moved for execution of the pick operation on the first inventory item 522A in parallel with the scanning operation on the second plurality of inventory items 530 stored on the second inventory storage system 5106.

The pick operation on the first inventory item 522A of the first inventory storage system 508A and the scanning operation on the second plurality of inventory items 530 of the second inventory storage system 5106 may be executed at a first time ($T_1$) and a second time ($T_2$), respectively. The first time ($T_1$) and the second time ($T_2$) may correspond to a parallelism ($T_1$ equals $T_2$) in execution of both the scanning operation and the pick operation for the first inventory storage system 510A and the second inventory storage system 5106. Alternatively, the first time ($T_1$) and the second time ($T_2$) may correspond to a skew (a partial or no-overlap) in time of initialization ($T_1$ not equals $T_2$) of the scanning operation and the pick operation for the first inventory storage system 510A and the second inventory storage system 510B.

Figure 6A:
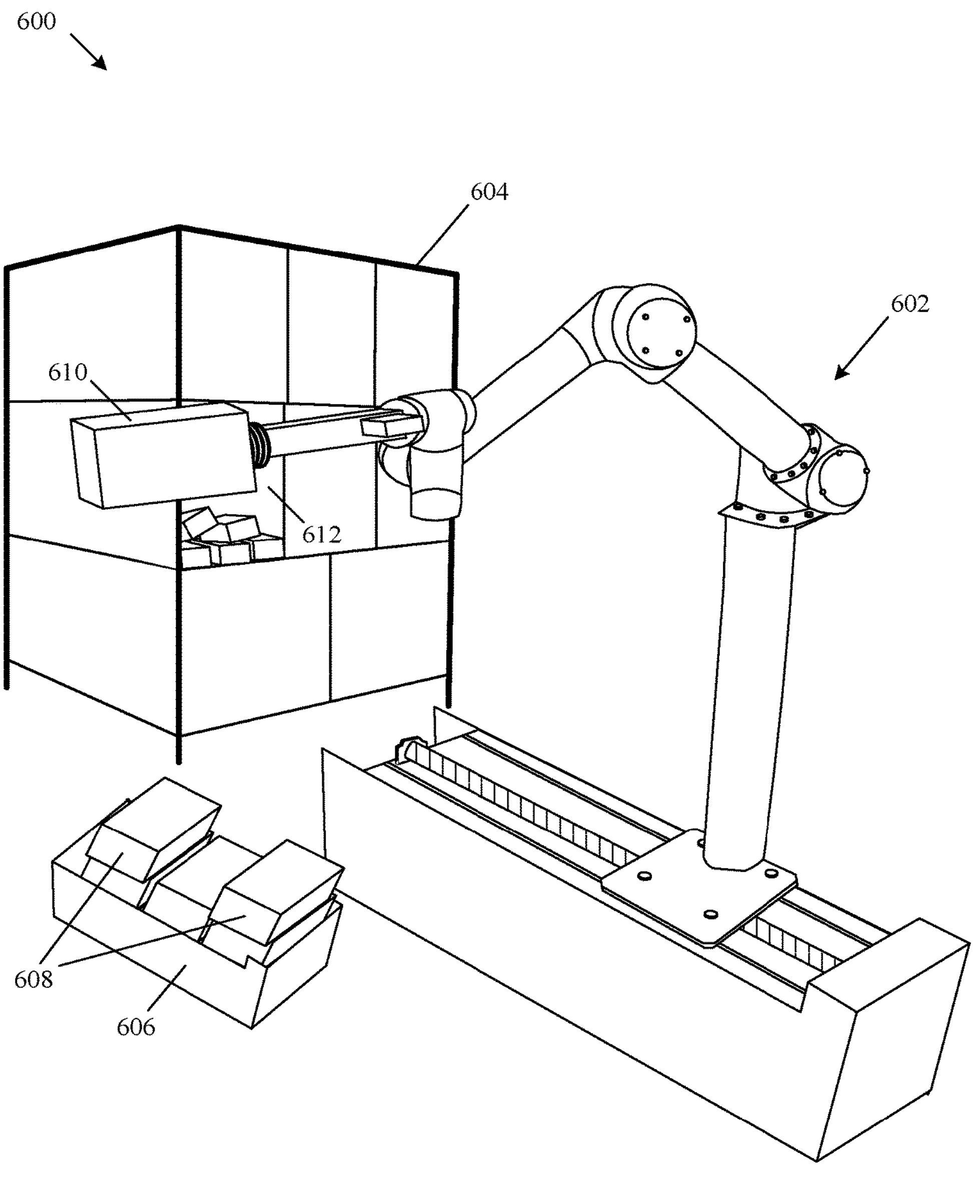
FIGS. 6A and 6B, collectively, illustrate a scenario for execution of put operation by an exemplary robotic manipulator in two different stages, in accordance with an embodiment of the disclosure.
Figure 6B:
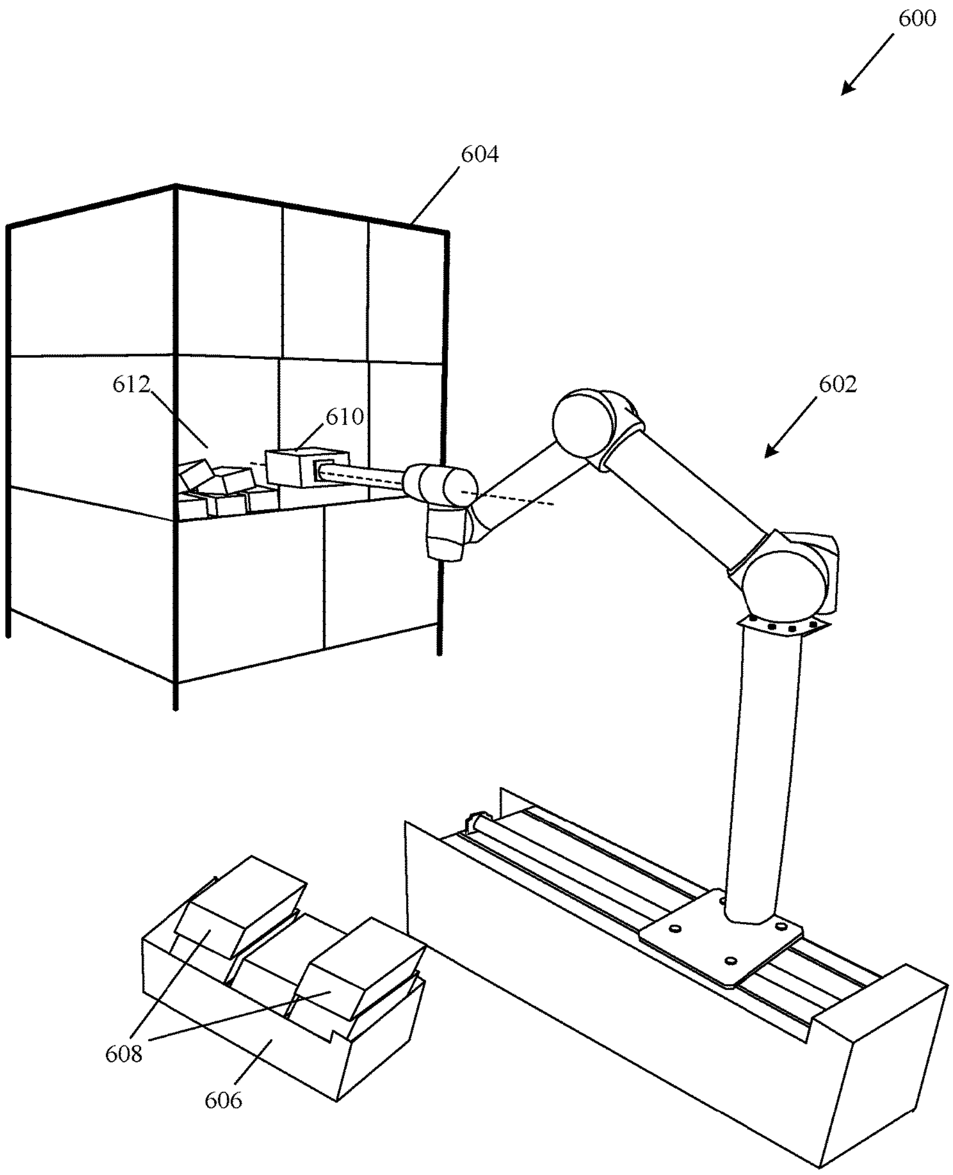

FIGS. 6A and 6B, collectively, illustrate a scenario for execution of put operation by the robotic manipulator in two different stages, in accordance with an embodiment of the disclosure. FIGS. 6A and 6B are explained in conjunction with elements from FIGS. 1, 2A, 2B, 3, 4A, 4B, 5A, and 5B. With reference to FIGS. 6A and 6B, there is shown a scenario 600. In the scenario 600, there is shown a robotic manipulator 602 (which may correspond to the robotic manipulator 422 of FIG. 4B), an inventory storage system

604, and a crate 606 in an inventory storage area (such as the inventory storage area 304) of a warehouse (such as the warehouse 302).

The scenario 600 depicts a put operation, in which the robotic manipulator 602 may be configured to pick up inventory items from a plurality of inventory items 608 arranged in the crate 606 (or in some cases, a palette) and put the picked up inventory items in storage bins (of the inventory storage system 604) allocated to each inventory item of the plurality of inventory items 608. The put operation may be part of a replenishing process for filling empty storage bins with inventory items that may have to be picked up in subsequent pickup cycles. In some embodiments, the control server 104 may be configured to generate a put plan that may describe a position of individual SKUs (i.e., inventory items) in storage bins of the inventory storage system 604.

In FIGS. 6A and 6B, the robotic manipulator 602 may be configured to pick up a first inventory item 610 from the plurality of inventory items 608 in the crate 606 and place the first inventory item 610 in a storage bin 612 of the inventory storage system 604. The movement of robotic arm and automatic selection and change of end effectors may be done based on instructions from the control server 104.

Figure 7A:
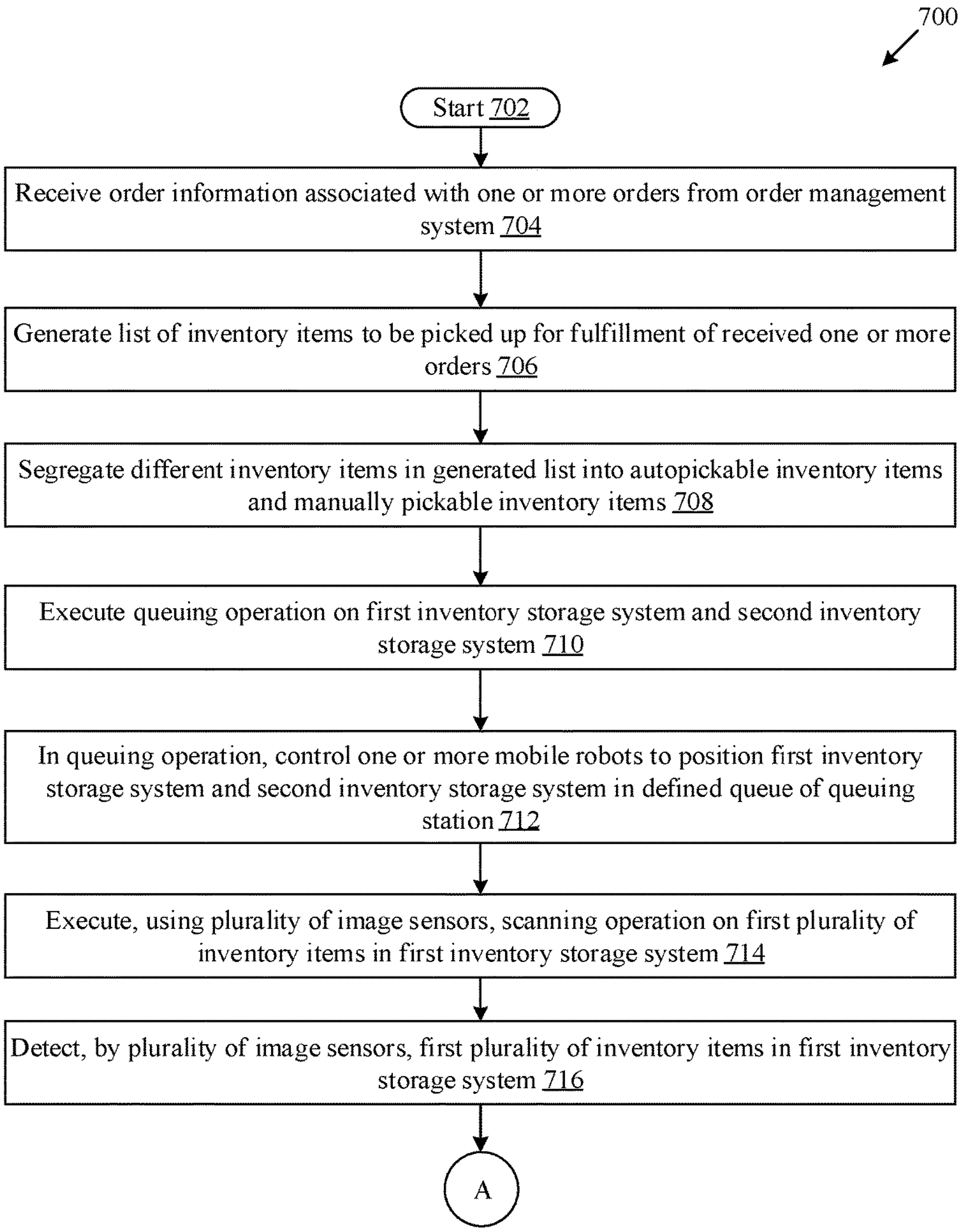
FIGS. 7A, 7B and 7C, collectively, illustrate a flowchart that depicts a method for fulfillment of orders in a warehouse, in accordance with an embodiment of the disclosure.
Figure 7B:
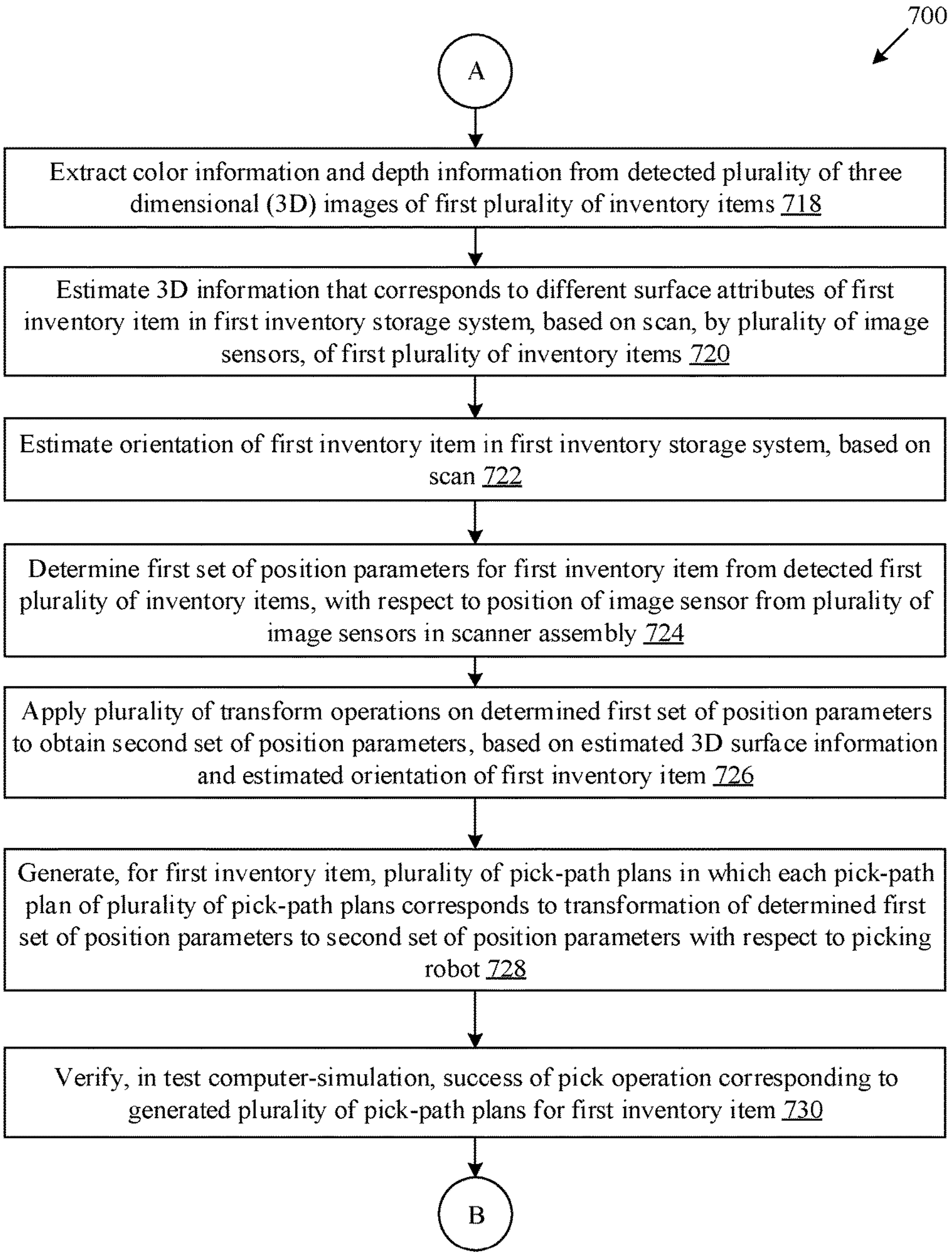
Figure 7C:
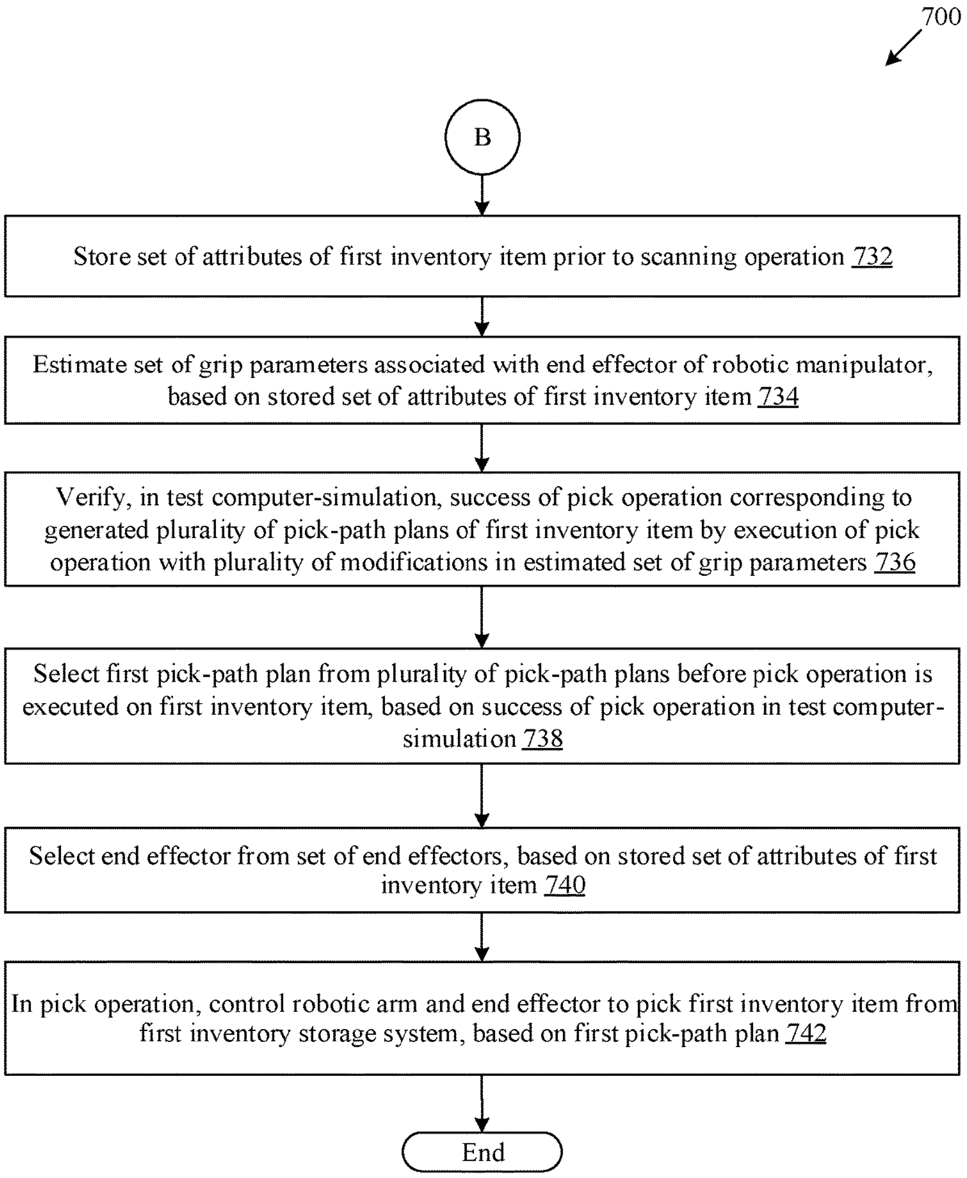

FIGS. 7A, 7B and 7C, collectively, illustrate a flowchart that depicts a method for fulfillment of orders in a warehouse, in accordance with an embodiment of the disclosure. FIGS. 7A, 7B, and 7C are explained in conjunction with elements from FIGS. 1, 2A, 2B, 3, 4A, 4B, 5A, 5B, 6A, and 6B. With reference to FIGS. 7A, 7B, and 7C, there is shown a flowchart 700. The operations described in the flowchart 700 may start at 702 and proceed to 704.

At 704, order information associated with one or more orders may be received from an order management system. The control server 104 may be configured to receive the order information associated with the one or more orders from the order management system.

At 706, a list of inventory items to be picked up for fulfillment of received one or more orders may be generated. The control server 104 may be configured to generate the list of inventory items to be picked up for fulfillment of the received one or more orders.

At 708, different inventory items in the generated list may be segregated into auto-pickable inventory items and manually pickable inventory items. The control server 104 may be configured to segregate the different inventory items in the generated list into auto-pickable inventory items and manually pickable inventory items.

At 710, a queuing operation may be executed on a first inventory storage system (e.g., the first inventory storage system 106A) and a second inventory storage system. The control server 104 may be configured to execute the queuing operation on the first inventory storage system and the second inventory storage system. An example of the queuing operation is shown and described in FIG. 5A.

At 712, in queuing operation, one or more mobile robots may be controlled to position the first inventory storage system and the second inventory storage system in a defined queue of a queuing station. In the queuing operation, the control server 104 may be configured to control the one or more mobile robots to position the first inventory storage system and the second inventory storage system in a defined queue of a queuing station (e.g., the queuing station 502).

At 714, a scanning operation may be executed, by using a plurality of image sensors 114, on a first plurality of inventory items in the first inventory storage system (e.g., the first inventory storage system 106A). The control server 104 may be configured to execute the scanning operation, by using the plurality of image sensors 114, on the first plurality of inventory items in the first inventory storage system 106A. An example of the scanning operation is shown and described in FIGS. 4A and 5A.

At 716, the first plurality of inventory items in the first inventory storage system 106A may be detected by using the plurality of image sensors 114. The control server 104 may be configured to detect the first plurality of inventory items in the first inventory storage system 106A by using the plurality of image sensors 114.

At 718, color information and depth information may be extracted from the plurality of 3D images of the plurality of inventory items. The control server 104 may be configured to extract color information and depth information from the plurality of 3D images of the plurality of inventory items.

At 720, 3D information that corresponds to different surface attributes of a first inventory item may be estimated based on scan of the first plurality of inventory items by the plurality of image sensors 114. The control server 104 may be configured to estimate 3D information that corresponds to different surface attributes of a first inventory item, based on scan of the first plurality of inventory items by the plurality of image sensors 114.

At 722, an orientation of the first inventory item in the first inventory storage system 106A may be estimated based on the scan of the first plurality of inventory items by the plurality of image sensors 114. The control server 104 may be configured to estimate the orientation of the first inventory item in the first inventory storage system 106A based on the scan of the first plurality of inventory items by the plurality of image sensors 114.

At 724, a first set of position parameters for the first inventory item may be determined from the detected first plurality of inventory items, with respect to position of an image sensor from the plurality of image sensors 114 in the scanner assembly 112. The control server 104 may be configured to determine the first set of position parameters for the first inventory item from the detected first plurality of inventory items, with respect to position of an image sensor from the plurality of image sensors 114 in the scanner assembly 112.

At 726, a plurality of transform operations may be applied on the determined first set of position parameters to obtain a second set of position parameters, based on the estimated 3D surface information and the estimated orientation of the first inventory item. The control server 104 may be configured to apply the plurality of transform operations on the determined first set of position parameters to obtain a second set of position parameters, based on the estimated 3D surface information and the estimated orientation of the first inventory item.

At 728, for the first inventory item, a plurality of pick-path plans may be generated, in which each pick-path plan of the plurality of pick-path plans corresponds to transformation of the determined first set of position parameters to the second set of position parameters with respect to the robotic manipulator 116. The control server 104 may be configured to generate, for the first inventory item, the plurality of pick-path plans, in which each pick-path plan of the plurality of pick-path plans corresponds to transformation of the determined first set of position parameters to the second set of position parameters with respect to the robotic manipulator 116.

At 730, in a test computer-simulation, a success of the pick operation corresponding to the generated plurality of pick-path plans may be verified for the first inventory item. The control server 104 may be configured to verify, in the test computer-simulation, a success of the pick operation corresponding to the generated plurality of pick-path plans may be verified for the first inventory item.

At 732, a set of attributes of the first inventory item may be stored prior to the scanning operation. The control server 104 may be configured to store the set of attributes of the first inventory item prior to the scanning operation.

At 734, a set of grip parameters associated with the end effector 120 of the robotic manipulator 116 may be estimated based on the stored set of attributes of the first inventory item. The control server 104 may be configured to estimate the set of grip parameters associated with the end effector 120 of the robotic manipulator 116 based on the stored set of attributes of the first inventory item.

At 736, in the test computer-simulation, a success of the pick operation corresponding to the generated plurality of pick-path plans for the first inventory item may be verified based on execution of the pick operation with a plurality of modifications in the estimated set of grip parameters. The control server 104 may be configured to verify, in the test computer-simulation, a success of the pick operation corresponding to the generated plurality of pick-path plans for the first inventory item, based on execution of the pick operation with a plurality of modifications in the estimated set of grip parameters.

At 738, a first pick-path plan may be selected from the plurality of pick-path plans before the pick operation is executed on the first inventory item, based on the success of the pick operation in the test computer-simulation. The control server 104 may be configured to select the first pick-path plan from the plurality of pick-path plans before the pick operation is executed on the first inventory item, based on the success of the pick operation in the test computer-simulation.

At 740, the end effector 120 may be selected from a set of end effectors, based on the stored set of attributes of the first inventory item. The control server 104 may be configured to control the robotic manipulator 116 to select the end effector 120 from the set of end effectors, based on the stored set of attributes of the first inventory item.

At 742, in the pick operation, the robotic arm 118 and the end effector 120 may be controlled to pick the first inventory item from the first inventory storage system 106A, based on the first pick-path plan. The control server 104 may be configured, in the pick operation, to control the robotic arm 118 and the end effector 120 to pick the first inventory item from the first inventory storage system 106A, based on the first pick-path plan. Control passes to end. An example of the pick operation is shown and described in FIGS. 4B and 5A.

Certain embodiments of the disclosure may be found in an identification and planning system (e.g., the identification and planning system 102) for fulfillment of orders. Various embodiments of the disclosure may provide an identification and planning system that includes a scanner assembly (e.g., the scanner assembly 112), a robotic manipulator (e.g., the robotic manipulator 116), and control server (e.g., the control server 104) that includes control circuitry (e.g., the control circuitry 208). The scanner assembly may include a plurality of image sensors (e.g., the plurality of image sensors 114) and the robotic manipulator may include a robotic arm (e.g., the robotic arm 118) and an end effector (e.g., the end effector 120) detachably attached to the robotic arm. The control circuitry may be configured to detect, by the plurality of image sensors, a first plurality of inventory items in a first inventory storage system (e.g., the first inventory storage system 106A) and determine a first set of position parameters for a first inventory item from the detected first plurality of inventory items. The first set of position parameters may be determined with respect to a position of the plurality of image sensors in the scanner assembly. The control circuitry may be further configured to generate a plurality of pick-path plans for the first inventory item. Each pick-path plan of the plurality of pick-path plans may correspond to a transformation of the determined first set of position parameters to a second set of position parameters with respect to the robotic manipulator. In accordance with an embodiment, the first set of position parameters may be spatially different from the second set of position parameters. Such spatial differentiation may be caused by a difference in position of the scanner assembly and the robotic manipulator. A first pick-path plan may be selected by the control circuitry from the plurality of pick-path plans. The first pick-path plan may be selected before a pick operation is executed on the first inventory item. In accordance with an embodiment, the control circuitry may be configured to select the first pick-path plan for the first inventory item during an idle state of the robotic manipulator and the scanner assembly. The selection of the first pick-path plan may be done based on a success of the pick operation, in a test computer-simulation, based on the second set of position parameters corresponding to the first pick-path plan. In the pick operation, the control circuitry may be further configured to control the robotic arm and the end effector to pick the first inventory item from the first inventory storage system, based on the first pick-path plan.

In accordance with an embodiment, the identification and planning system may further include a first mobile robot (e.g., the first mobile robot 110A). The first inventory storage system may be mounted on the first mobile robot that may be configured to move the first inventory storage system from a first location to a second location in a warehouse, based on instructions received from the control circuitry. The first inventory storage system may include a first plurality of storage bins. Each storage bin of the first plurality of storage bins, present at different spatial positions in the first inventory storage system, may accommodate the first plurality of inventory items.

In accordance with an embodiment, the control circuitry may be further configured to execute, using the plurality of image sensors, a scanning operation on the first plurality of inventory items in the first inventory storage system. In the scanning operation, the control circuitry may be further configured to extract color information and depth information from a plurality of three dimensional (3D) images of the first plurality of inventory items. The scanning operation may further include the detection of the first plurality of inventory items and the determination of first set of position parameters.

In accordance with an embodiment, the identification and planning system may further include a second inventory storage system that may include a second plurality of storage bins. Each storage bin of the second plurality of storage bins, present at different spatial positions in the second inventory storage system, may accommodate a second plurality of inventory items. The control circuitry may be configured to execute the pick operation on the first inventory item of the first inventory storage system, in parallel with the scanning operation on the second plurality of inventory items in one or more storage bins of the second inventory storage system.

In accordance with an embodiment, the control circuitry may be further configured to execute a queuing operation on the first inventory storage system and a second inventory storage system prior to an execution of the pick operation. The identification and planning system may further include at least one mobile robot. In the queuing operation, the control circuitry may be configured to control the at least one mobile robot to position the first inventory storage system and the second inventory storage system in a defined queue of a queuing station. The defined queue may include grid regions. The scanner assembly may be positioned in front of a first grid region of the grid regions and the robotic manipulator is positioned in front of a second grid region of the grid regions. In the queuing operation, the control circuitry may be further configured to control the at least one mobile robot to move the first inventory storage system and the second inventory storage system through the grid regions of the defined queue. The first inventory storage system and the second inventory storage system may be moved for execution of the pick operation on the first inventory item in parallel with the scanning operation on the second plurality of inventory items in the second inventory storage system.

In accordance with an embodiment, the control circuitry may be further configured to estimate 3D information that corresponds to different surface attributes of the first inventory item in the first inventory storage system, based on a scan, by the plurality of image sensors, of the first plurality of inventory items. Also, an orientation of the first inventory item in the first inventory storage system may be estimated by the control circuitry based on the scan of the first plurality of inventory items. The control circuitry may be further configured to apply a plurality of transform operations on the determined first set of position parameters to obtain the second set of position parameters. The plurality of transform operations may be applied based on the estimated 3D surface information and the estimated orientation of the first inventory item. In certain embodiments, the control circuitry may be further configured to verify, in the test computer-simulation, the success of the pick operation of the first inventory item. The success of the operation may be verified based on execution of the pick operation corresponding to the application of each transform operation of the plurality of transform operations on the determined first set of position parameters.

In accordance with an embodiment, the robotic manipulator may further include a plurality of actuators in the robotic arm. The plurality of actuators may allow a movement of the robotic arm and the end effector within a defined number of degrees of freedom in a 3D space. The success of the pick operation may correspond to an event in the test computer-simulation, in which a simulation of the robotic manipulator picks the first inventory item using a simulated movement of the plurality of actuators. The simulated movement may be based on a defined number of degrees of freedom of the robotic arm and the second plurality of position parameters in the first pick-path plan.

In accordance with an embodiment, the identification and planning system may further include a memory that may be configured to store a set of attributes of the first inventory item prior to the scanning operation and the pick operation. The control circuitry may be further configured to estimate a set of grip parameters associated with the end effector of the robotic manipulator, based on the stored set of attributes of the first inventory item. The control circuitry may be further configured to verify, in the test computer-simulation, the success of the pick operation of the first inventory item by execution of the pick operation with a plurality of modifications in the estimated set of grip parameters. The control circuitry may be further configured to select the end effector from a set of end effectors, based on the stored set of attributes of the first inventory item.

In accordance with an embodiment, each of the detected first plurality of inventory items in the first inventory storage system may be associated with a unique tag that corresponds to a stock keeping system (SKU). The control circuitry may be further configured to segregate, prior to the scanning operation and the pick operation, the first plurality of inventory items into a first set of inventory items and a second set of inventory items. The segregation of the first plurality of inventory items may be done based on the unique tag for each of the first plurality of inventory items. The first set of inventory items may correspond to inventory items that are auto pickable by the robotic manipulator and the second set of inventory items may correspond to inventory items manually pickable by a warehouse operator.

Certain embodiments of the disclosure may be found in an identification and planning system for fulfillment of orders. Various embodiments of the disclosure may provide an identification and planning system that includes a control server. The control server may include control circuitry, which may be configured to detect a first plurality of inventory items in a first inventory storage system and determine a first set of position parameters for a first inventory item from the detected first plurality of inventory items. The first set of position parameters may be determined with respect to a position of a plurality of image sensors. The control circuitry may be further configured to generate a plurality of pick-path plans for the first inventory item. Each pick-path plan of the plurality of pick-path plans may correspond to a transformation of the determined first set of position parameters to a second set of position parameters with respect to a robotic manipulator. The control circuitry may be further configured to select a first pick-path plan from the plurality of pick-path plans. The first pick-path plan may be selected before a pick operation is executed on the first inventory item. The selection of the first pick-path plan may be done based on a success of the pick operation in a test computer-simulation. The success of the pick operation may be determined based on the second set of position parameters corresponding to the first pick-path plan. In the pick operation, the control circuitry may be further configured to control a robotic arm and an end effector detachably attached to the robotic arm, to pick the first inventory item from the first inventory storage system, based on the first pick-path plan.

While the present disclosure is described with reference to certain embodiments, it will be understood by those skilled in the art that various changes may be made and equivalents may be substituted without departing from the scope of the present disclosure. Additionally, many modifications may be made to adapt a particular situation or material to the teachings of the present disclosure without departing from its scope. Therefore, it is intended that the present disclosure not be limited to the particular embodiment disclosed, but that the present disclosure will include all embodiments that fall within the scope of the appended claims. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure.

As used herein, the terms “comprises,” “comprising,” “includes,” “including,” “has,” “having” or any contextual variants thereof, are intended to cover a non-exclusive inclusion. For example, a process, product, article, or apparatus that comprises a list of elements is not necessarily limited to only those elements, but may include other elements not expressly listed or inherent to such process, product, article, or apparatus. Further, unless expressly stated to the contrary, "or" refers to an inclusive or and not to an exclusive or. For example, a condition "A or B" is satisfied by any one of the following: A is true (or present) and B is false (or not present), A is false (or not present) and B is true (or present), and both A and B is true (or present).

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, reversed, or otherwise controlled by another process. It will also be appreciated that one or more of the elements depicted in the drawings/figures can also be implemented in a more separated or integrated manner, or even removed or rendered as inoperable in certain cases, as is useful in accordance with a particular application.

What is claimed is:

1. An identification and planning system, comprising:

a scanner assembly that comprises one or more image sensors;

a robotic manipulator that comprises a robotic arm and an end effector detachably attached to the robotic arm; and a control server comprising control circuitry, wherein the control circuitry is configured to:

detect, by the one or more image sensors, a first plurality of inventory items in a first inventory storage system;

determine a first set of position parameters for a first inventory item from the detected first plurality of inventory items, the first set of position parameters are determined with respect to a position of an image sensor of the one or more image sensors in the scanner assembly;

generate a plurality of pick-path plans for the first inventory item, wherein each pick-path plan of the plurality of pick-path plans corresponds to a transformation of the determined first set of position parameters to a second set of position parameters with respect to a spatial differentiation caused by a difference in position of the scanner assembly and the robotic manipulator;

select a first pick-path plan from the plurality of pick-path plans, wherein the first pick-path plan is selected before a pick operation is executed on the first inventory item, and the selection of the first pick-path plan is based on a success of the pick operation in a test computer-simulation, the success of the pick operation occurs when the second set of position parameters corresponding to the selected first pick-path plan allow the robotic manipulator to reach and hold the first inventory item; and in the pick operation, control, based on the first pick-path plan, the robotic arm and the end effector to pick the first inventory item from the first inventory storage system.

2. The identification and planning system according to claim 1, further comprising a first mobile robot, wherein the first inventory storage system is mounted on the first mobile robot that is configured to move the first inventory storage system from a first location to a second location in a warehouse based on instructions received from the control circuitry.

3. The identification and planning system according to claim 1, wherein the first inventory storage system comprises a first plurality of storage bins, wherein each storage bin of the first plurality of storage bins is located at different spatial positions in the first inventory storage system, the first plurality of storage bins accommodates the first plurality of inventory items.

4. The identification and planning system according to claim 1, wherein the control circuitry is further configured to execute, using the one or more image sensors, a scanning operation of the first plurality of inventory items in the first inventory storage system.

5. The identification and planning system according to claim 4, wherein, in the scanning operation, the control circuitry is further configured to extract color information and depth information from a plurality of three dimensional (3D) images of the first plurality of inventory items, and wherein the scanning operation further comprises the detection of the first plurality of inventory items and the determination of first set of position parameters.

6. The identification and planning system according to claim 1, further comprising a second inventory storage system that comprises a second plurality of storage bins, wherein each storage bin of the second plurality of storage bins, present at different spatial positions in the second inventory storage system, accommodates a second plurality of inventory items.

7. The identification and planning system according to claim 6, wherein the control circuitry is further configured to execute the pick operation for the first inventory item of the first inventory storage system, in parallel with a scanning operation on the second plurality of inventory items in one or more storage bins of the second inventory storage system.

8. The identification and planning system according to claim 1, wherein the control circuitry is further configured to execute a queuing operation for the first inventory storage system and a second inventory storage system prior to an execution of the pick operation.

9. The identification and planning system according to claim 8, further comprising at least one mobile robot, wherein, in the queuing operation, the control circuitry is configured to control the at least one mobile robot to position the first inventory storage system and the second inventory storage system in a defined queue of a queuing station.

10. The identification and planning system according to claim 9, wherein the defined queue comprises grid regions, and wherein the scanner assembly is positioned in front of a first grid region of the grid regions and the robotic manipulator is positioned in front of a second grid region of the grid regions.

11. The identification and planning system according to claim 10, wherein, in the queuing operation, the control circuitry is further configured to control the at least one mobile robot to move the first inventory storage system and the second inventory storage system through the grid regions of the defined queue, and wherein the first inventory storage system and the second inventory storage system are moved for execution of the pick operation for the first inventory item in parallel with the scanning operation on the second plurality of inventory items in the second inventory storage system.

12. The identification and planning system according to claim 1, wherein the control circuitry is further configured to:

estimate, based on a scan by one or more image sensors, three dimensional (3D) information that corresponds to different surface attributes of the first inventory item in the first inventory storage system of the first plurality of inventory items; and estimate an orientation of the first inventory item in the first inventory storage system, based on the scan.

13. The identification and planning system according to claim 12, wherein the control circuitry is further configured to apply a plurality of transform operations to the determined first set of position parameters to obtain the second set of position parameters, based on the estimated 3D surface information and the estimated orientation of the first inventory item.

14. The identification and planning system according to claim 13, wherein the control circuitry is further configured to verify, in the test computer-simulation, the success of the pick operation on the first inventory item, based on execution of the pick operation corresponding to the application of each transform operation of the plurality of transform operations on the determined first set of position parameters.

15. The identification and planning system according to claim 1, wherein the robotic manipulator further comprises a plurality of actuators in the robotic arm, wherein the plurality of actuators allow a movement of the robotic arm and the end effector within a defined number of degrees of freedom in a three dimensional (3D) space.

16. The identification and planning system according to claim 15, wherein the success of the pick operation corresponds to an event in the test computer-simulation, in which a simulation of the robotic manipulator picks the first inventory item using a simulated movement of the plurality of actuators, and wherein the simulated movement is based on a defined number of degrees of freedom of the robotic arm and the second plurality of position parameters in the first pick-path plan.

17. The identification and planning system according to claim 1, further comprising a memory configured to store a set of attributes of the first inventory item prior to a scanning operation and the pick operation, wherein the control circuitry is further configured to estimate a set of grip parameters associated with the end effector of the robotic manipulator, based on the stored set of attributes of the first inventory item.

18. The identification and planning system according to claim 17, wherein the control circuitry is further configured to verify, in the test computer-simulation, the success of the pick operation of the first inventory item by execution of the pick operation with a plurality of modifications in the estimated set of grip parameters.

19. The identification and planning system according to claim 18, wherein the control circuitry is further configured to select the end effector from a set of end effectors, based on the stored set of attributes of the first inventory item.

20. The identification and planning system according to claim 1, wherein each of the detected first plurality of inventory items in the first inventory storage system is associated with a unique tag that corresponds to a stock keeping unit (SKU).

21. The identification and planning system according to claim 20, wherein the control circuitry is further configured to segregate, prior to a scanning operation and the pick operation, the first plurality of inventory items into a first set of inventory items and a second set of inventory items.

22. The identification and planning system according to claim 21, wherein the segregation of the first plurality of inventory items is based on the unique tag for each of the first plurality of inventory items, and wherein the first set of inventory items correspond to inventory items that are auto pickable by the robotic manipulator and the second set of inventory items correspond to inventory items manually pickable by a warehouse operator.

23. The identification and planning system according to claim 1, wherein the first set of position parameters are spatially different from the second set of position parameters, and wherein the spatial differentiation is caused by a difference in a spatial location of the scanner assembly and the robotic manipulator.

24. An identification and planning system, comprising:

a control server comprising control circuitry, wherein the control circuitry is configured to:

detect a first plurality of inventory items in a first inventory storage system;

determine a first set of position parameters for a first inventory item from the detected first plurality of inventory items, the first set of position parameters being determined with respect to a position of an image sensor of one or more image sensors included in a scanner assembly;

generate a plurality of pick-path plans for the first inventory item, wherein each pick-path plan of the plurality of pick-path plans corresponds to a transformation of the determined first set of position parameters to a second set of position parameters with respect to a spatial differentiation caused by a difference in position of the scanner assembly and a robotic manipulator;

select a first pick-path plan from the plurality of pick-path plans, wherein the first pick-path plan is selected before a pick operation is executed on the first inventory item, and the selection of the first pick-path plan is based on a success of the pick operation in a test computer-simulation, the success of the pick operation occurs when the second set of position parameters corresponding to the selected first pick-path plan allow the robotic manipulator to reach and hold the first inventory item; and in the pick operation, control, based on the selected first pick-path plan, a robotic arm and an end effector detachably attached to the robotic arm to pick the first inventory item from the first inventory storage system.

25. A method of an identification and planning system that includes control circuitry and one or more image sensors, the method comprising:

detecting, by the one or more image sensors, a first plurality of inventory items in a first inventory storage system;

determining, by the control circuitry, a first set of position parameters for a first inventory item from the detected first plurality of inventory items, the first set of position parameters being determined with respect to a position of an image sensor of the one or more image sensors included in a scanner assembly;

generating, by the control circuitry, a plurality of pick-path plans for the first inventory item, wherein each pick-path plan of the plurality of pick-path plans corresponds to a transformation of the determined first set of position parameters to a second set of position parameters with respect to a spatial differentiation caused by a difference in position of the scanner assembly and a robotic manipulator;

selecting, by the control circuitry, a first pick-path plan from the plurality of pick-path plans, wherein the first pick-path plan is selected before a pick operation is executed on the first inventory item, and the selection of the first pick-path plan is based on a success of the pick operation in a test computer-simulation, the success of the pick operation occurs when the second set of position parameters corresponding to the selected first pick-path plan allow the robotic manipulator to reach and hold the first inventory item; and in the pick operation, controlling, by the control circuitry and based on the selected first pick-path plan, a robotic arm and an end effector detachably attached to the robotic arm to pick the first inventory item from the first inventory storage system.

* * * * *